(12) United States Patent
Sankrithi

(10) Patent No.: US 7,240,908 B2
(45) Date of Patent: Jul. 10, 2007

(54) POGO-SKI

(75) Inventor: Mithra M. K. V. Sankrithi, Lake Forest Park, WA (US)

(73) Assignee: RSV Invention Enterprises, Lake Forest Park, WA (US)

( * ) Notice: Subject to any disclaimer, the term of this patent is extended or adjusted under 35 U.S.C. 154(b) by 0 days.

(21) Appl. No.: 10/814,747

(22) Filed: Apr. 1, 2004

(65) Prior Publication Data

US 2005/0218610 A1    Oct. 6, 2005

(51) Int. Cl.
 *B62B 15/00* (2006.01)
(52) U.S. Cl. ............... 280/21.1; 280/601; 280/606; 280/14.21; 280/14.27
(58) Field of Classification Search ........... 280/14.28, 280/14.21, 14.22, 14.27, 87.042, 87.041, 280/606, 607, 601, 15, 16, 21.1, 22, 22.1, 280/18, 18.1; 482/77; D21/413; 472/135
See application file for complete search history.

(56) References Cited

U.S. PATENT DOCUMENTS

| | | | | |
|---|---|---|---|---|
| 1,391,312 A | * | 9/1921 | Gebhardt | 280/14.28 |
| 1,559,390 A | * | 10/1925 | Waller | 441/68 |
| 1,745,643 A | * | 2/1930 | Roessel | 280/7.12 |
| 2,392,098 A | * | 1/1946 | Philippar | 280/14.28 |
| 2,593,974 A | * | 4/1952 | Brown | 280/14.28 |
| 3,139,287 A | * | 6/1964 | Annis | 280/28.11 |
| 3,338,589 A | * | 8/1967 | Barton et al. | 280/21.1 |
| 3,400,643 A | * | 9/1968 | Danforth | 472/90 |
| 3,774,923 A | * | 11/1973 | Suroff | 280/601 |
| 3,947,049 A | * | 3/1976 | Pedersen | 280/609 |
| 4,047,732 A | * | 9/1977 | Williams et al. | 280/287 |
| 4,087,106 A | * | 5/1978 | Winchell | 280/14.28 |
| 4,088,338 A | * | 5/1978 | Winchell et al. | 280/220 |
| 4,643,444 A | * | 2/1987 | Parkinson | 280/606 |
| 4,678,445 A | * | 7/1987 | Monreal | 441/72 |
| 4,708,353 A | * | 11/1987 | Evequoz | 280/16 |
| 4,773,659 A | * | 9/1988 | Rygiel | 280/142 |
| 5,096,217 A | * | 3/1992 | Hunter | 280/607 |
| 5,127,672 A | * | 7/1992 | Horibata | 280/842 |
| 6,739,606 B2 | * | 5/2004 | Rappaport | 280/87.041 |
| 6,783,134 B2 | * | 8/2004 | Geary | 280/21.1 |
| 6,827,673 B2 | * | 12/2004 | Chen et al. | 482/77 |
| 6,929,267 B2 | * | 8/2005 | Sullivan et al. | 280/14.28 |
| 2002/0020980 A1 | * | 2/2002 | Lee | 280/87.041 |
| 2002/0149175 A1 | * | 10/2002 | Knapschafer | 280/617 |
| 2003/0141682 A1 | * | 7/2003 | Comden | 280/14.28 |

* cited by examiner

*Primary Examiner*—Christopher P. Ellis
*Assistant Examiner*—John Walters

(57) ABSTRACT

This invention relates to recreational equipment for use on a sliding surface, such as skis, snowboards, or other equipment for use by a person such as a skier, snowboarder or water-skier. This invention provides a pogo-ski comprising a ski and a post thereon which is fitted with foot supports and a handhold suitable for use by a standing user.

71 Claims, 27 Drawing Sheets

POGO-SKI

BACKGROUND OF THE INVENTION

This invention relates to recreational equipment of the sliding or gliding kind, such as skis, snowboards, or other equipment with runners for use by a person such as a skier or snowboarder. Prior art skis are well-known for downhill skiing, cross-country skiing and ski-jumping, and prior-art snowboards are also well-known. The prior art also discloses bicycle-style ski-bobs or snow-bikes with a user seat and handlebar, which are supported by skis or snow runners. Ski-joring devices suitable for towing by a tow animal or by a tow snowmobile are also known from the prior art. Finally, water skis for use on a water surface are also known from the prior art for a user being towed behind a motorboat.

BRIEF SUMMARY OF THE INVENTION

It is an object of the present invention to provide a new class of recreational equipment of the sliding or gliding kind.

It is an object of the present invention to provide a new class of recreational equipment of the sliding or gliding kind, for use by a standing user whose feet and hands can engage the equipment and contribute to its movement and control in a beneficial manner.

It is an object of the present invention to provide a new class of recreational equipment of the sliding or gliding kind, with a single ski and a post projecting upwards from it, with footrests on either side of the post and a handlebar at the top of the post. It is a related object to enable the footrests to move up and down, including the case of one going up while the other goes down as may be desirable for maneuvering or for traversing a steep ski slope with the upper footrest not contacting the rising slope above the upper side of the traversing ski.

It is also an object of the present invention to provide a new class of recreational equipment of the sliding or gliding kind, further including a spring element to allow the user to bounce up and down deliberately and repeatedly while sliding or gliding.

Further objects of the invention will become evident from a full consideration of the following descriptive portion of the patent specification, figures and claims.

DETAILED DESCRIPTION

The following detailed description will be better understood by first defining explanatory meanings to be construed for certain terms and expressions, as follows:

The expression "pogo-ski" is to be construed to include any of a variety of sliding recreational devices usable by a "user", as described and claimed in the following descriptive portion of the specification, figures, and claims. The word "user" is to be construed to mean any person who can use such a "pogo-ski" for recreational or other purposes.

The word "ski" is to be construed to include sliding and gliding devices or runners with a lower running surface intended for use on sliding surfaces including snow, frozen surfaces and water. Under this definition a "ski" could, for example, be a downhill ski, a short ski, a ski-jumping ski, a cross-country ski, a snowboard, or a water ski.

The word "spring" is to be construed to include any of a variety of devices with a monotonic force versus displacement characteristic over some range of displacements, including a coil spring, hydraulic spring, pneumatic spring, compressible material (e.g., rubber) spring, and other such devices as are known from the prior art.

The word "post" is to be construed to include any of a variety of structural members of varying cross-section or geometry and capable of withstanding compressive and bending loads to at least some extent.

Certain words and expressions relate to a presumed axis system, which can be defined as follows for a pogo-ski. The "roll" axis of the pogo-ski is an axis line lying substantially in a plane of symmetry of the ski part of the pogo-ski, from back to front running from the bottom of the lowest point of the aft end of the ski to the bottom of the lowest point of forward end of the ski. A rolling moment is a moment or torque substantially around the roll axis, positive right side down. The "yaw" axis is perpendicular to the "roll" axis, points downward from a point directly below where a lower post meets the ski, and lies substantially in the plane of symmetry of the ski. A yawing moment is a moment or torque substantially around the yaw axis, positive for the front end of the ski being torqued to the right. The "pitch" axis is perpendicular to the roll and yaw axes and points to the right. A pitching moment is a moment or torque substantially around the pitch axis, and is positive for the front end of the ski being torqued upward. This axis system corresponds to a typical "body axis" system used for airplanes and similar vehicles.

The word "standing" refers to any of a variety of postures of a user wherein a majority of the user's weight, on a time-averaged basis, is supported by the feet of the user, with additional weight support optionally provided by the hands of the user and without reliance on weight support by a seat acting on the buttocks of the user.

Figure 1:
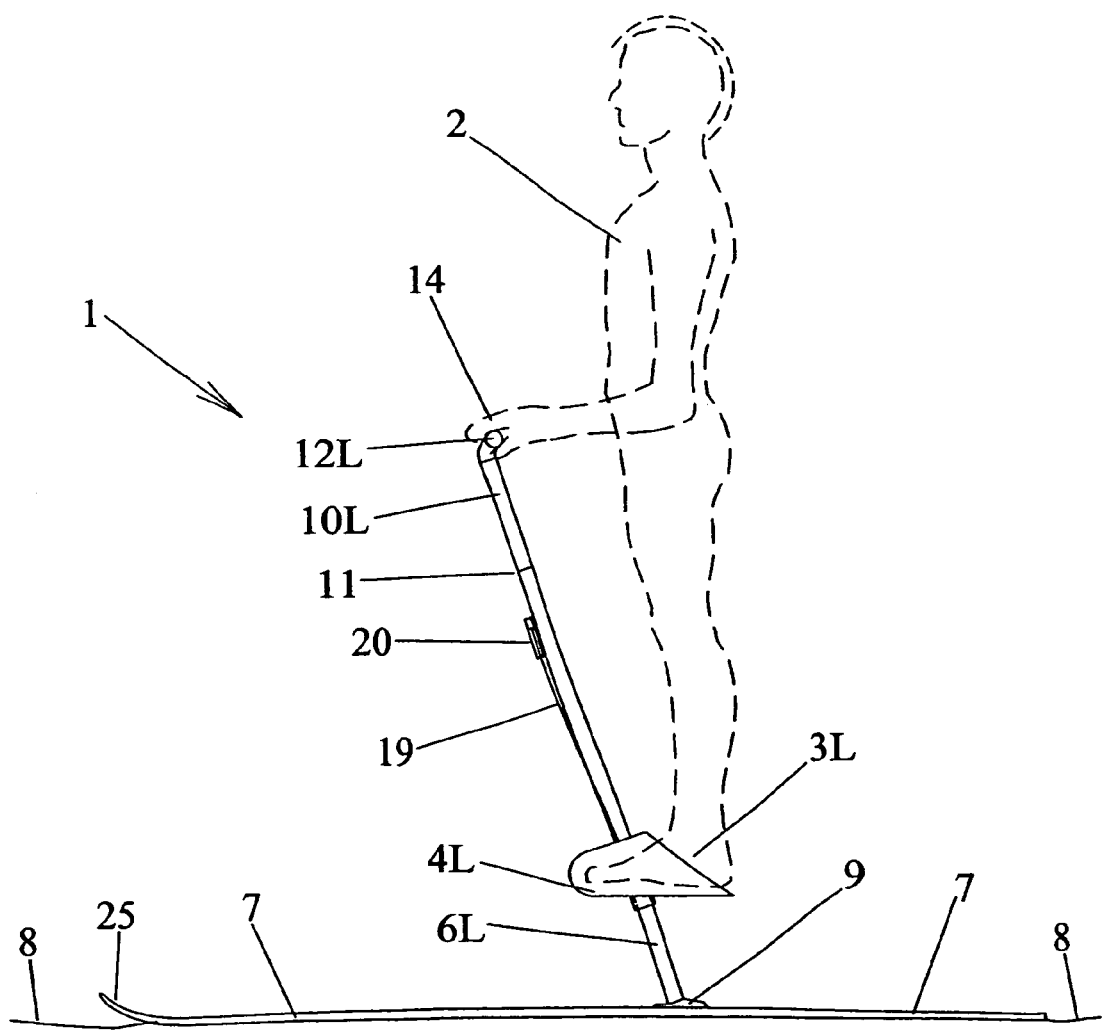
FIG. 1 shows a side view of one preferred embodiment of a pogo-ski.

FIG. 1 shows a side view of a pogo-ski 1 supporting a user 2, with the user in a representative standing posture shown in dashed lines, above a ski 7 providing means for sliding on a sliding surface 8. The ski 7 has a ski shovel 25 at its forward end. The left foot 3L of the user 2 is shown supported by a left foot support 4L. The illustrated foot support 4L has an adjustable or custom-fit shoe/boot holder into which the user can easily insert his or her shoe/boot through a rear entry opening. Not visible in the view of FIG. 1 is the corresponding right foot of the user supported by a corresponding right foot support on the other side of the pogo-ski. When the user starts to ski he or she will typically insert one shoe/boot into a foot support on one side of the pogo-ski, and start moving forward by pushing with the other foot and then insert the other foot into the other foot support. This starting concept is similar to that used by a user starting motion on a scooter or bicycle.

A left lower post 6L is connected to said ski 7 by lower post connecting means 9, as illustrated. The post is shown connected in a forward and upward inclined configuration in this embodiment, and might be more nearly vertical and inclined either forward or backwards slightly in other variant embodiments. The left lower post 6L supports the aforementioned left foot support 4L, as will be explained in the following with reference to FIG. 2.

FIG. 1 also illustrates a left upper post 10L which is substantially located above said left lower post 6L, and which is connected to said left lower post 6L by upper post connecting means 11. The lower and upper posts may optionally be lower and upper portions of the same post, in variant embodiments. FIG. 1 further illustrates left handhold means 12 for being holdable by at least one hand 14 (left hand illustrated) of said user 2, which left handhold means are connected to said left upper post 10L by handhold connection means (not visible in this view). FIG. 1 also shows a linking cable 19 and pulley means 20, which will be further described with reference to FIG. 3.

The illustrated sliding surface 8 is a snow surface, or is a frozen surface (e.g., such as an icy ski area surface), or is a water surface (e.g., as used for water-skiing), or is a low-friction solid sliding surface, for alternate applications of this preferred embodiment of the invention. A low-friction solid sliding surface could include a nylon-blend carpet, and/or Snowflex® which is a polymer composite, comprising a monofilament fiber and impregnated carrier layer which sits on top of a shock-absorbing layer. In one variant embodiment the low-friction solid sliding surface uses a Teflon® surface coating or other very-low-friction surface coating. In other embodiments a low-friction sliding surface could be of granular material, such as sand.

While FIG. 1 shows the user 2 riding the pogo-ski in an representative erect standing posture, it will be understood that the user may lean forward, backward, or sideways, or maneuver his or her body to alternate configurations with bent knees, bent ankles, bent elbows, bent wrists, bent shoulders, bent waist, lateral or longitudinal hip displacements, motions of his or her center of mass, bent neck or in other ways as desired to maintain balance, maintain visibility and to move and maneuver in desired ways upon the sliding surface 8. Motion control by the user may involve moving weight laterally from one edge of the ski to the other, tilting or banking the ski laterally, moving weight from the front to the aft portion of the ski, and/or "unweighting" the ski to foster turn initiation involving the application of rolling and yawing moments on the pogo-ski by the user.

Figure 2:
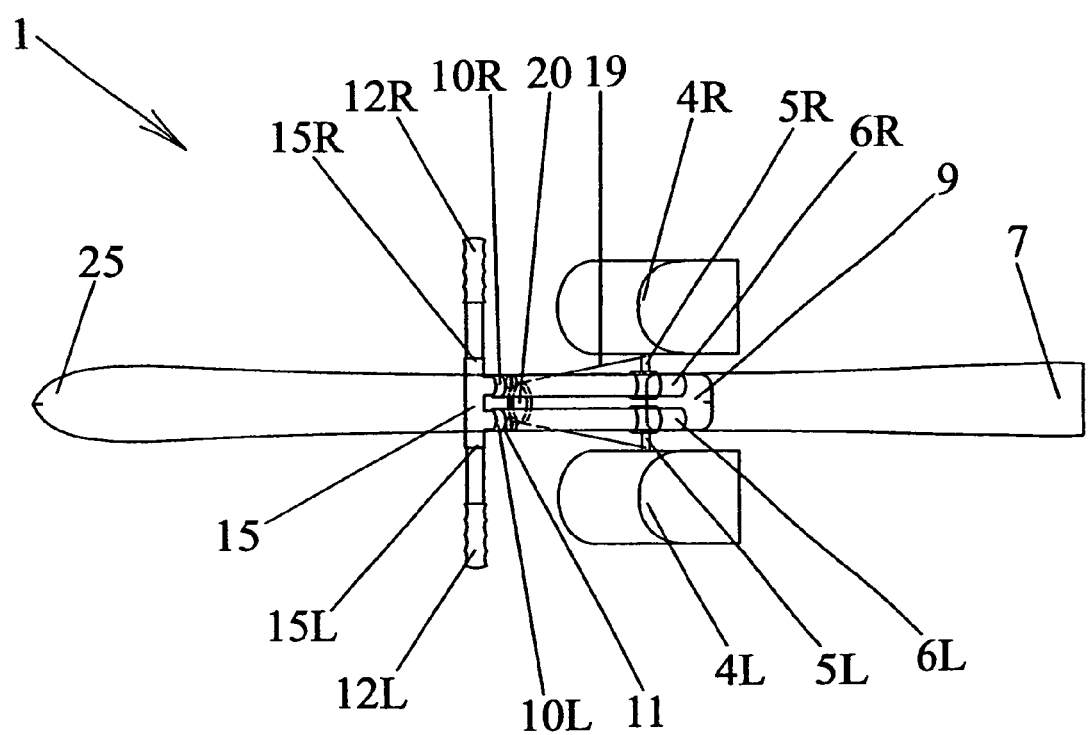
FIG. 2 shows a top view of the embodiment of FIG. 1.

FIG. 2 shows a top view of the embodiment of FIG. 1, wherein left foot support connecting means 5L connecting left foot support 4L to said left lower post 6L, and right foot support connecting means 5R connecting right foot support 4R to right lower post 6R are illustrated. FIG. 2 also illustrates handhold connection means 15 including left handhold connection means 15L which serves as means for connecting left handhold means 12L to said left upper post 10L, and including right handhold connection means 15R which serves as means for connecting right handhold means 12R to right upper post 10R.

Figure 3:
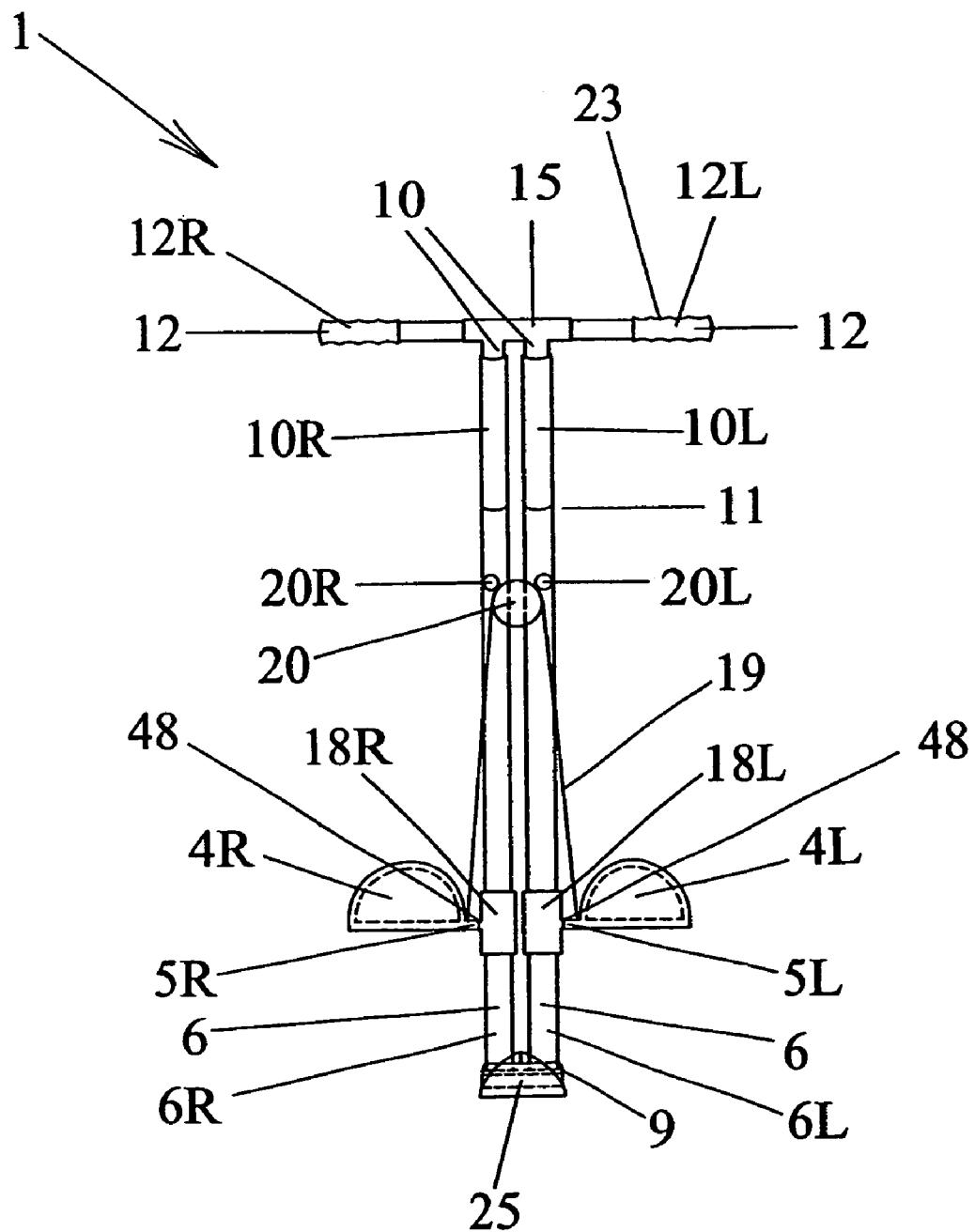
FIG. 3 shows a front view of the embodiment of FIG. 1 and FIG. 2.

FIG. 3 shows a front view of the embodiment of FIG. 1 and FIG. 2. The front view of FIG. 3 shows left translational motion permitting means 18L (e.g., ball bearings between the left foot support connecting means 5L and a vertically grooved surface of the left lower post 6L, not shown) included in the left foot support connecting means 5L, for permitting said left foot support 4L to move in a direction including a vertical component, and right translational motion permitting means 18R (e.g., ball bearings between the right foot support connecting means 5R and a vertically grooved surface of the right lower post 6R, not shown) included in the right foot support connecting means 5R, for permitting said right foot support 4R to move in a direction including a vertical component. Other bearing means besides ball bearings are possible in variant embodiments, such as low friction sliding bearings such as Teflon® coated sliding bearings. Also clearly visible in the front view of FIG. 3 are pitch-axis hinge means 48 included in said left foot support connecting means 5L and said right foot support connecting means 5R, for permitting pitch-axis rotation of said left foot support 4L and of said right foot support 4R. Pitch-axis foot rotations may be desired by the user while moving each foot up or down, or while leaning or bending his or her knee(s).

The embodiment as illustrated in FIG. 3 also shows that left foot support connecting means 5L and said right foot support connecting means 5R are coupled together by means of a linking cable 19 which runs around pulley means (comprising in this embodiment a primary pulley 20, a left guide roller 20L and a right guide roller 20R) attached to the lower post 6. The linking cable 19 is connected on one side of said pulley means to the left foot support connecting means 5L, and is connected on the other side of the pulley means to the right foot support connecting means 5R. The illustrated linking cable 19 includes elastic and viscoelastic elements permitting it to stretch in a damped elastic manner. The linking cable could be a metallic or fiber cable, a braided rope, a bungee cord or other cable type as known from the prior art. The pulley means may also incorporate integral spring or damping elements. The net effect of this linking is that the user can move one foot up while the other goes down, as desired during traverses at an angle relative to the downward slope of a ski run and during turning maneuvers. This may also be desired during braking maneuvers when the skier deliberately orients the ski approximately perpendicularly to the direction of motion, while banking away from the direction of motion. The use of an elastic & viscoelastic linking cable will also provide some benefits in symmetric conditions such as absorbing shocks from bumps in the terrain, as well as enabling the user to deliberately bounce or jump as desired in a manner analogous to a user on a pogo-stick.

The embodiment illustrated in FIGS. 1, 2 and 3 provides a pogo-ski 1, comprising in combination: a ski 7 providing means for sliding on a sliding surface 8, a lower post 6 (in this embodiment comprising left lower post 6L and right lower post 6R in combination) projecting upward from said ski 7 and connected to said ski 7 by lower post connecting means 9, a left foot support 4L connected by left foot support connecting means 5L to said lower post 6 (specifically left lower post 6L in this embodiment) above said ski 7 which left foot support 4L serves as means for supporting the left foot 3L of a user 2, a right foot support 4R connected by right foot support connecting means 5R to said lower post 6 (specifically right lower post 6R in this embodiment) above said ski 7 which right foot support 4R serves as means for supporting the right foot 3R of said user 2, and handhold means 12 comprising in combination left handhold means 12L and right handhold means 12R for being holdable by at least one hand 14 of said user 2, which handhold means 12 are connected by handhold connection means 15 to an upper post 10 (in this embodiment comprising left upper post 10L and right upper post 10R in combination), which upper post 10 is connected by upper post connecting means 11 to said lower post 6 and which upper post 10 is substantially located above said lower post.

The embodiment illustrated in FIGS. 1, 2 and 3 further provides a pogo-ski 1, wherein said handhold means 12 comprises left and right handlebars (left handhold means 12L and right handhold means 12R) suitable for holding by the left and right hands of said user 2, respectively, and wherein said handhold connection means 15 comprises means for connecting said left and right handlebars to the top of said upper post 10. The embodiment illustrated in FIGS. 1, 2 and 3 further provides a pogo-ski 1, wherein said left and right handlebars include contoured surfaces 23 which can be gripped by the fingers of the left and right hands of said user 2.

The embodiment illustrated in FIGS. 1, 2 and 3 further provides a pogo-ski 1, wherein said handhold means 12 comprises a left handhold 12L and a right handhold 12R, wherein said left handhold 12L is connected by left handhold connection means 15L to a left upper post 10L, which left upper post 10L is connected by left upper post connecting means 11L to said left lower post 6L and which left upper post 10L is substantially located above said left lower post 6L, and wherein said right handhold 12R is connected by right handhold connection means 15R to a right upper post 10R, which right upper post 10R is connected by right upper post connecting means 11R to said right lower post 6R and which right upper post 10R is substantially located above said right lower post 6R.

The embodiment illustrated in FIGS. 1, 2 and 3 further provides a pogo-ski 1, wherein the majority of said user's weight is supported by said left foot support 4L and said right foot support 4R and the balance of said user's weight is supported by said handhold means 12, when said user is riding on said pogo-ski 1 in a non-accelerating condition.

The embodiment illustrated in FIGS. 1, 2 and 3 further provides a pogo-ski 1, wherein said left foot support 4L is located on the left side of said lower post 6; and wherein said right foot support 4R is located on the right side of said lower post 6.

The embodiment illustrated in FIGS. 1, 2 and 3 further provides a pogo-ski 1, wherein said left foot support connecting means 5L includes left translational motion permitting means 18L for permitting said left foot support 4L to move in a direction including a vertical component, and wherein said right foot support connecting means 5R includes right translational motion permitting means 18R for permitting said right foot support 4R to move in a direction including a vertical component.

The embodiment illustrated in FIGS. 1, 2 and 3 further provides a pogo-ski 1, wherein said left foot support connecting means 5L and said right foot support connecting means 5R are coupled together. As illustrated, the left foot support connecting means 5L and said right foot support connecting means 5R are coupled together by means of a linking cable 19 which runs around pulley means (comprising in this embodiment a primary pulley 20, a left guide roller 20L and a right guide roller 20R) attached to said lower post 6, and which linking cable 19 is connected on one side of said pulley means to at least one of said left foot support 4L and said left foot support connecting means 5L, and is connected on the other side of said pulley means 20 to at least one of said right foot support 4R and said right foot support connecting means 5R. The illustrated linking cable 19 includes an elastic element permitting it to effectively stretch, and further includes a viscoelastic element. Clearly variant embodiments are possible wherein the linking cable does not include one or both of an elastic element and a viscoelastic element.

With the linking cable 19 including an elastic element and a viscoelastic element and with the linking cable 19 running around pulley means 20 attached to said lower post 6, the embodiment illustrated in FIGS. 1, 2 and 3 therefore provides a pogo-ski 1 wherein said left foot support connecting means 5L and said right foot support connecting means 5R coupled together provide at least one spring in the connection between said left foot support 4L and said right foot support 4R on the one hand, and said lower post 6 on the other hand; and wherein said left foot support connecting means 5L and said right foot support connecting means 5R coupled together provide at least one damper in the connection between said left foot support 4L and said right foot support 4R on the one hand, and said lower post 6 on the other hand.

The embodiment illustrated in FIGS. 1, 2 and 3 further provides a pogo-ski 1, wherein said left foot support connecting means 5L and said right foot support connecting means 5R include pitch-axis hinge means 48 for permitting pitch-axis rotation of said left foot support 4L and of said right foot support 4R.

The embodiment illustrated in FIGS. 1, 2 and 3 further provides a pogo-ski 1, comprising in combination: a ski 7 providing means for sliding on a sliding surface 8, a lower post 6 projecting upward from said ski 7 and connected to said ski by lower post connecting means 9, a left foot support 4L connected by left foot support connecting means 5L to said pogo-ski 1 above said ski 7, which left foot support 4L serves as means for supporting the left foot 3L of a user 2, a right foot support 4R connected by right foot support connecting means 5R to said pogo-ski 1 above said ski 7, which right foot support 4R serves as means for supporting the right foot 3R of said user 2, and handhold means 12 for being holdable by at least one hand 14 of said user 2, which handhold means 12 are connected by handhold connection means 15 to an upper post 10, which upper post 10 is connected by upper post connecting means 11 to said lower post 6 and which upper post 10 is substantially located above said lower post 6.

The embodiment illustrated in FIGS. 1, 2 and 3 further provides a pogo-ski 1, comprising in combination: a ski 7 providing means for sliding on a sliding surface 8, a left lower post 6L and a right lower post 6R projecting upward from said ski 7 and connected to said ski 7 by lower post connecting means 9, a left foot support 4L connected by left foot support connecting means 5L to said left lower post 6L above said ski 7 which left foot support 4L serves as means for supporting the left foot 3L of a user 2, a right foot support 4R connected by right foot support connecting means 5R to said right lower post 6R above said ski 7 which right foot support 4R serves as means for supporting the right foot 3R of said user 2, and handhold means 12 for being holdable by at least one hand 14 of said user 2, which handhold means 12 are connected by handhold connection means 15 to an upper post 10, which upper post 10 is connected by upper post connecting means 11 to at least one of said left lower post 6L and said right lower post 6R (to both in the illustrated embodiment of FIGS. 1, 2 and 3), and which upper post 10 is substantially located above at least one of said left lower post 6L and said right lower post 6R (to both in the illustrated embodiment of FIGS. 1, 2 and 3). Note that the lower post connecting means may be one integrated unit connecting both the left lower post 6L and the right lower post 6R to the ski 7 as illustrated, or in a variant embodiment may comprise two separate but nearby units with one each connecting the ski 7 to the left lower post 6L and the right lower post 6R respectively.

Figure 4:
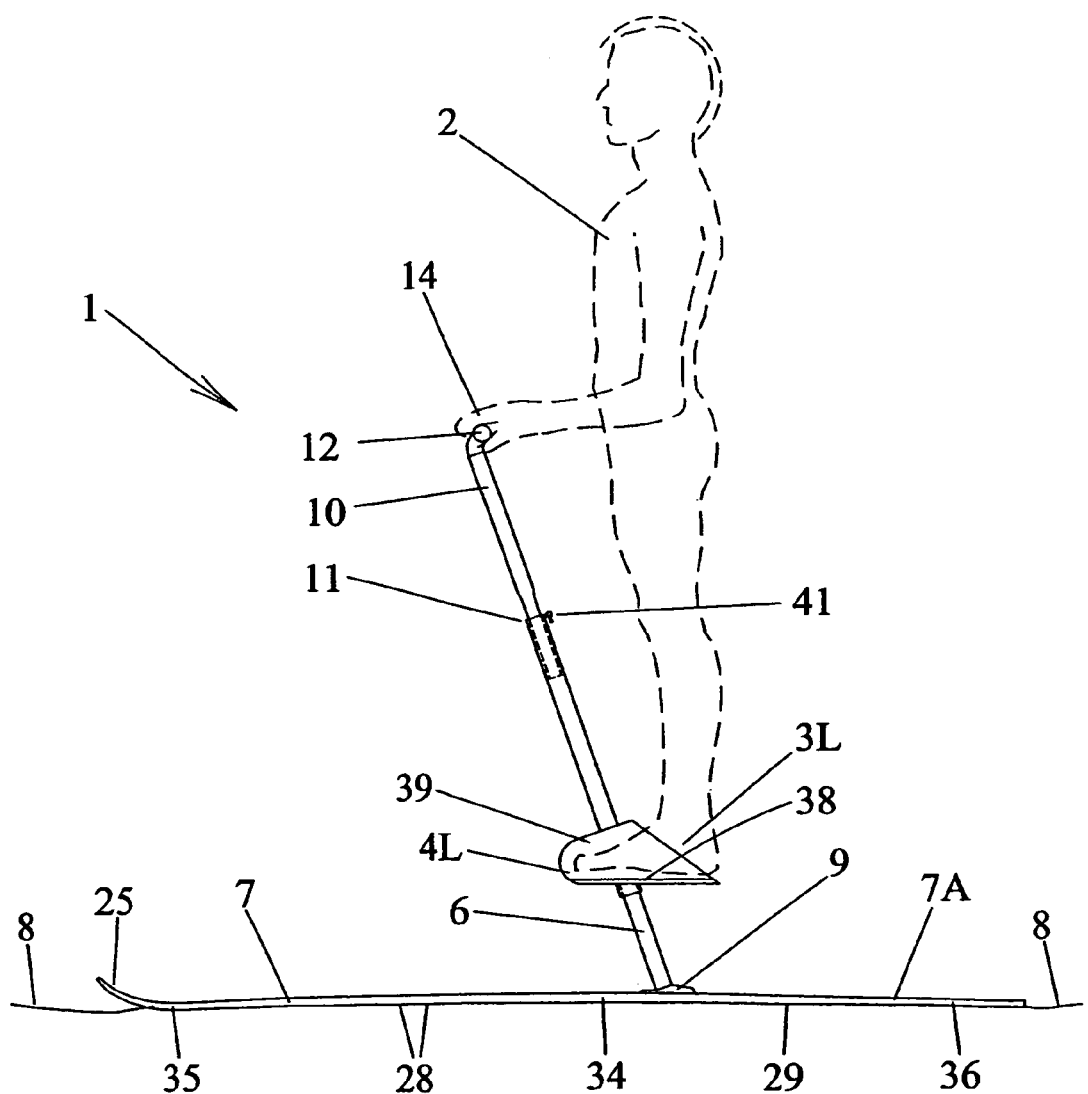
FIG. 4 shows a side view of another preferred embodiment of a pogo-ski.

FIG. 4 shows a side view of another preferred embodiment of a pogo-ski. Unlike the embodiment of FIGS. 1, 2 and 3, this embodiment has a single lower post 6 connected to the ski 7 by lower post connecting means 9, and a single upper post 10 connected to the lower post 6 by upper post connecting means 11. The embodiment of FIG. 4 also does not have the translation permitting means for the left foot support 4L and right foot support 4R or the linking cable 19 which were present in the embodiment of FIGS. 1, 2 and 3.

The ski 7 in FIG. 4 is a downhill ski 7A, and has a ski shovel 25 at its forward end. The ski 7 has a camber 28 combined with a thickness distribution wherein the ski is thicker in its middle region (34) than at locations near the forward (35) and aft (36) ends of the ski 7, to foster the appropriate distribution of the point load from the user's weight over the length of the ski.

FIG. 4 also illustrates a left foot support 4L which includes foot enclosing surfaces 39 connected to a foot plate 38, which foot enclosing surfaces 39 enclose the sides and top of said left foot 3L.

The embodiment illustrated in FIG. 4 further provides a pogo-ski 1, wherein the lower post 6 is of substantially circular cross-section, and wherein the upper post 10 is of substantially circular cross-section. As illustrated, said upper post connection means 11 comprises a telescopic slidable connection between said upper post 10 and said lower post 6. The slidable connection could utilize either the upper or lower post having a larger diameter substantially circular cross-section. The upper post connection means 11 incorporates means for setting the height of the handhold means 12 at different levels wherein said means for setting the height include a quick-release mechanism 41, as illustrated. The quick-release mechanism may utilize a quick-release latch, bolt, twist-lever or other quick-release mechanism as known from the prior art, as for example from bicycle quick release hubs and handlebar adjustment fittings.

Figure 5:
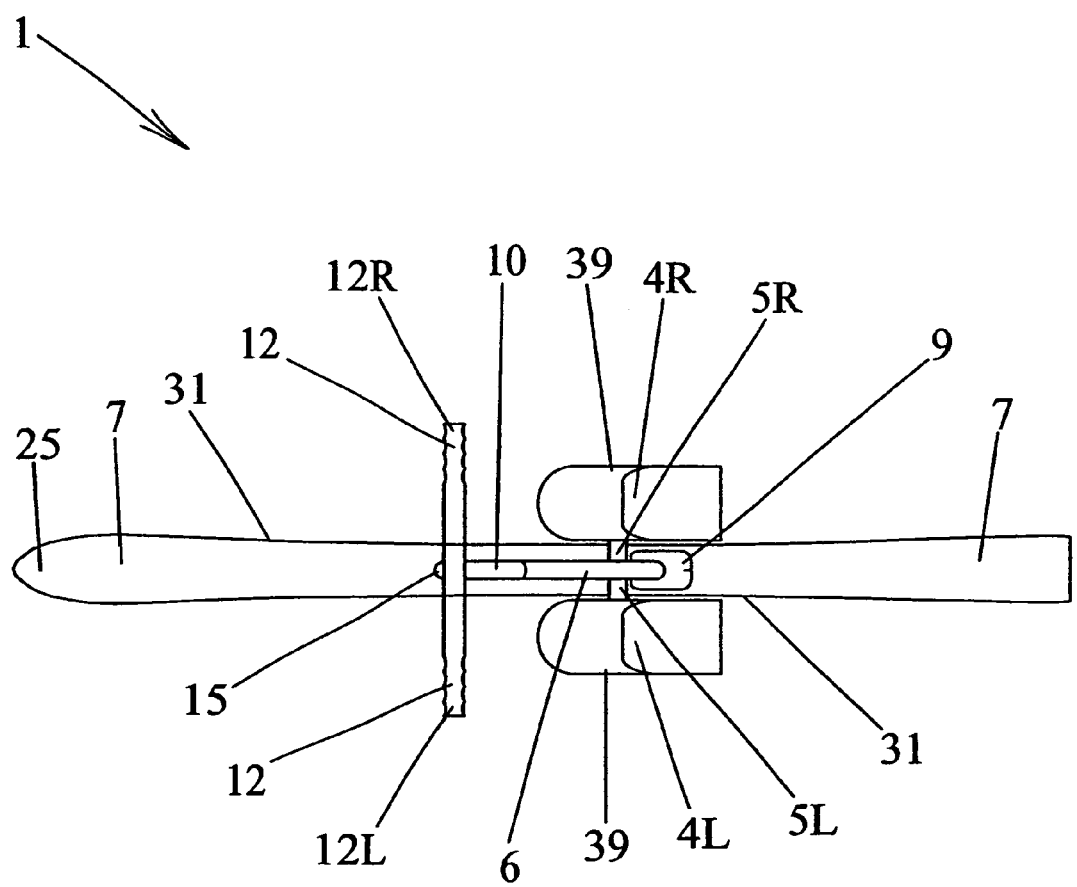
FIG. 5 shows a top view of the embodiment of FIG. 4.

FIG. 5 shows a top view of the embodiment of FIG. 4. In this top view of the pogo-ski 1, it can be seen that the ski 7 has outwardly concave curved edges 31 when viewed in plan view. These outwardly concave curved edges facilitate "carved" turns, as is known from the prior art in ski construction.

Figure 6:
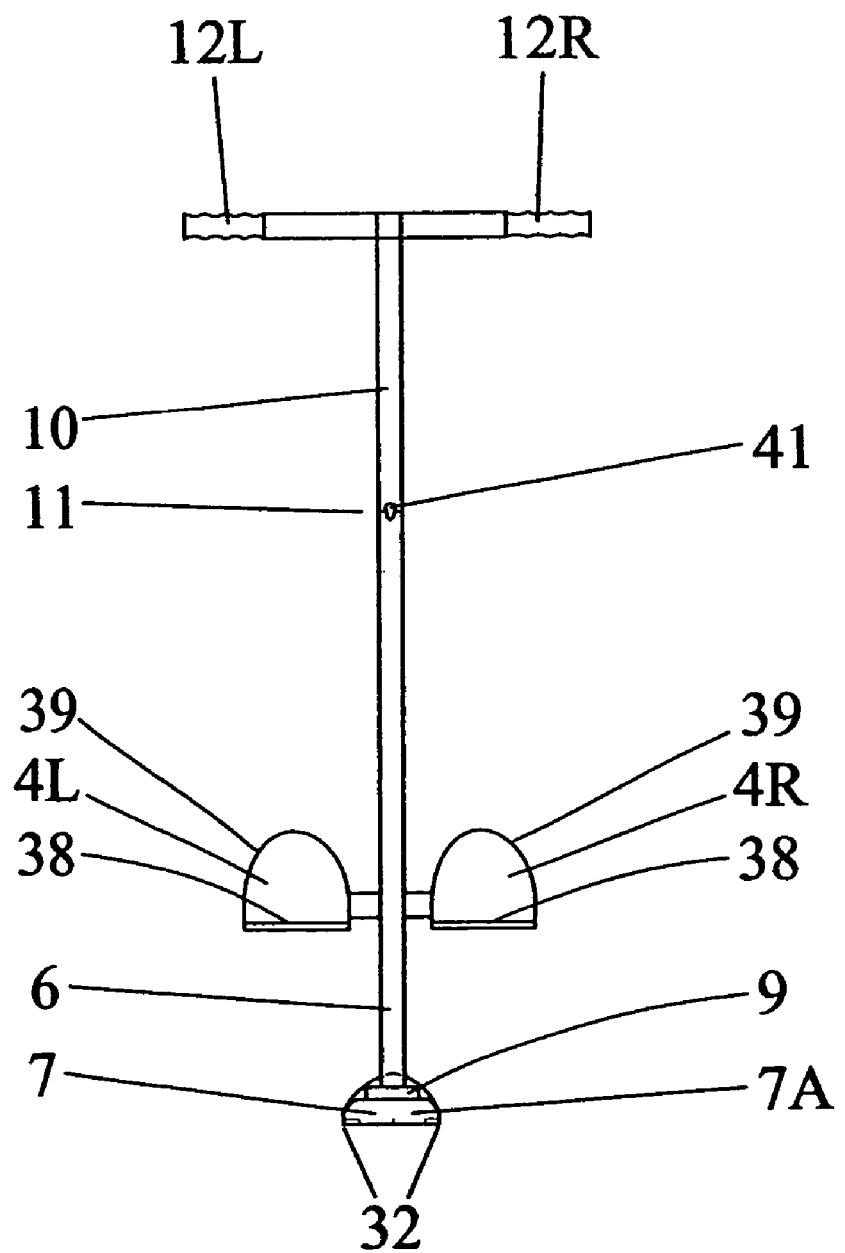
FIG. 6 shows an aft view of the embodiment of FIG. 4 and FIG. 5.

FIG. 6 shows an aft view of the embodiment of FIG. 4 and FIG. 5. In this aft view of the pogo-ski 1, it can be seen that the ski 7 further comprises sharp cornered edges 32 along the lower left and right corners of said ski 7 when viewed from the rear or in transverse cross-section. These sharp cornered edges also facilitate "carved" turns and enable a ski sideward-skidding braking technique, as is known from the prior art in ski construction and use.

The embodiment illustrated in FIGS. 4, 5 and 6 provides a pogo-ski 1, comprising in combination: a ski 7 providing means for sliding on a sliding surface 8, a lower post 6 projecting upward from said ski 7 and connected to said ski 7 by lower post connecting means 9, a left foot support 4L connected by left foot support connecting means 5L to said lower post 6 above said ski 7 which left foot support 4L serves as means for supporting the left foot 3L of a user 2, a right foot support 4R connected by right foot support connecting means 5R to said lower post 6 above said ski 7 which right foot support 4R serves as means for supporting the right foot 3R of said user 2, and handhold means 12 comprising in combination left handhold means 12L and right handhold means 12R for being holdable by at least one hand 14 of said user 2, which handhold means 12 are connected by handhold connection means 15 to an upper post 10, which upper post 10 is connected by upper post connecting means 11 to said lower post 6 and which upper post 10 is substantially located above said lower post.

The embodiment illustrated in FIGS. 4, 5 and 6 further provides a pogo-ski 1, wherein said ski 7 is a downhill type of ski 7A in the illustrated embodiment. The ski 7 has a ski shovel 25 at its forward extremity. The ski 7 has camber 28 to distribute load along its lower surface, comprising a low-friction running surface 29, when said user 2 is on said pogo-ski 1 with said user's feet supported by said left foot support 4L and said right foot support 4R. To further foster appropriate load distribution, the ski 7 is thicker near the location of said lower post connecting means (34) than at locations near the forward (35) and aft (36) ends of said ski 7, and employs appropriate internal materials, structural design and construction as is known from prior art ski technology.

The embodiment illustrated in FIGS. 4, 5 and 6 further provides a pogo-ski 1, wherein said left foot support 4L and said right foot 4R support each include a foot plate 38 on which the left foot 3L and right foot 3R of the user 2, respectively, can be supported. The left foot support 4L and right foot support 4R each also include foot enclosing surfaces 39 connected to the foot plate 38, which foot enclosing surfaces 39 enclose the sides and top of said left foot 3L and right foot 3R of the user 2, respectively.

The embodiment illustrated in FIGS. 4, 5 and 6 further provides a pogo-ski 1, wherein the user 2 can impart a rolling moment on the ski 7 by shifting his or her weight laterally, and wherein the user 2 can impart a rolling moment on the ski 7 by shifting the amount of his or her weight acting on said left foot support 4L as compared with the amount of his or her weight acting on the right foot support 4R. The embodiment illustrated in FIGS. 4, 5 and 6 further provides a pogo-ski 1, wherein the user 2 can impart a rolling moment on the ski 7 by applying a rolling moment to the handhold means 12, preferably with two hands with some lateral separation, one lifting and one pushing down, on opposite side handlebars. The embodiment illustrated in FIGS. 4, 5 and 6 further provides a pogo-ski 1, wherein the user 2 can impart a yawing moment on the ski 7 by pushing forward with a foot on either the left foot support 4L or the right foot support 4R, and wherein the user 2 can also impart a yawing moment on the ski 7 by applying a yawing moment to the handhold means 12, preferably with two hands with some lateral separation, one pulling back and one pushing forward, on opposite side handlebars.

Figure 7:
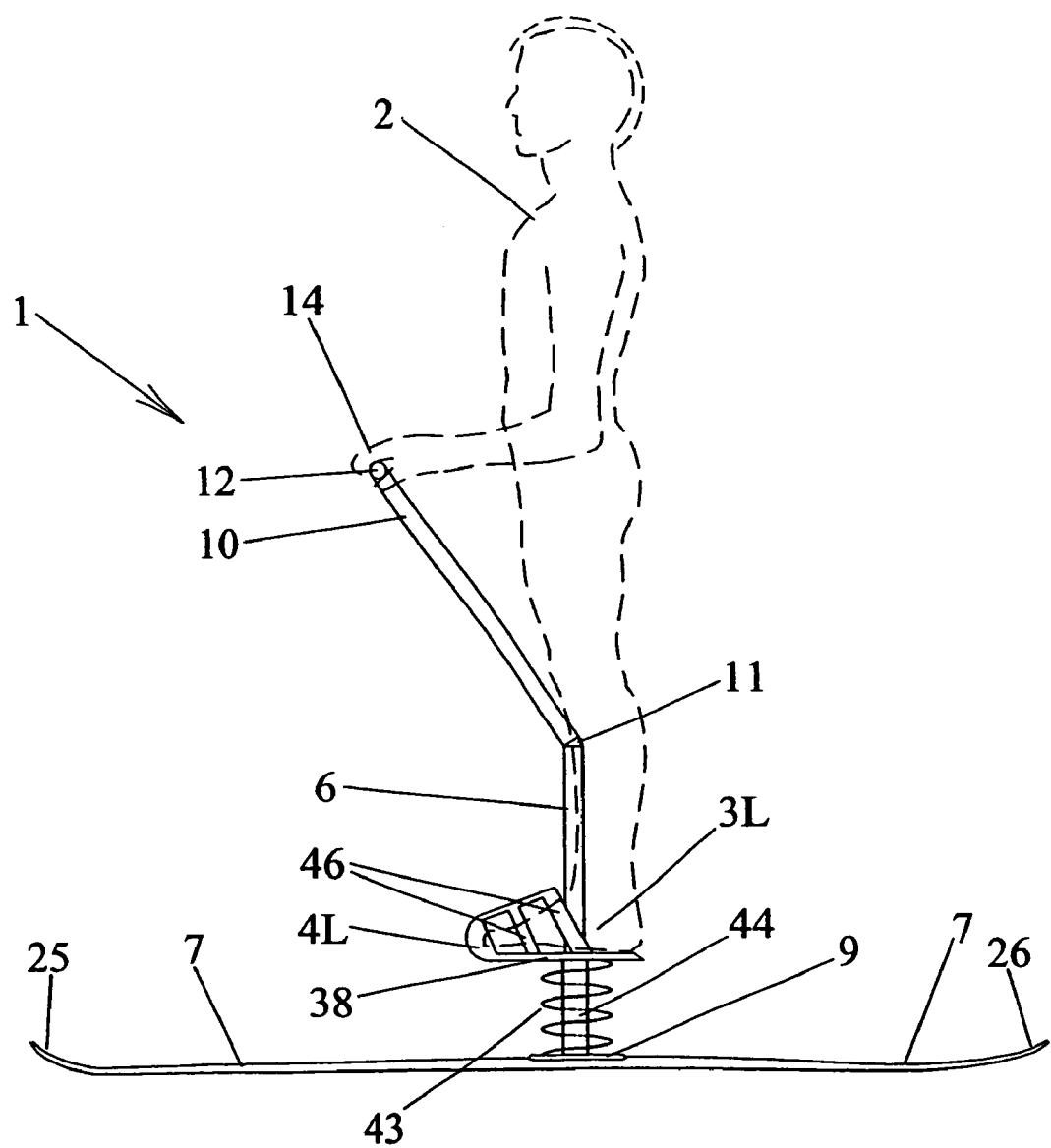
FIG. 7 shows a side view of another preferred embodiment of a pogo-ski.

FIG. 7 shows a side view of another preferred embodiment of a pogo-ski 1. In this embodiment the lower post 6 is substantially vertically attached relative to the ski 7 by lower post connecting means 9, while upper post 10 is fitted with a forwardly inclined orientation by means of upper post connecting means 11. The left foot support 4L (and the corresponding right foot support, not seen) include a foot plate 38, which in this embodiment is supported by a coil spring 43 between the foot plate 38 and the upper surface of the ski 7 in the vicinity of the lower post connecting means 9. The coil spring 43 is typically statically in compression between the foot plate 38 (which supports much of the weight of the user 2) on the one hand and the upper surface of the ski 7 on the other hand. A cylindrical shock absorber damper 44 is also provided between the foot plate 38 and the top of the ski 7, as illustrated. Thus the embodiment illustrated in FIG. 7 provides a pogo-ski 1, wherein the left foot support 4L and the right foot support each include a foot plate 38 on which the left foot 3L and right foot of the user, respectively, can be supported. As illustrated, the left foot support 4L and the right foot support (not seen) each also include strap means 46 connected to said foot plate, which strap means 46 restrain lateral and upward movement of the left foot and right foot of the user, respectively. The strap means 46 will preferably comprise adjustable, buckled, and/or elastic straps for engaging the shoe/boot on the feet of the user 2.

The ski 7 of the embodiment of FIG. 7 has a ski shovel 25 at its forward extremity, and also has a ski shovel 26 at its aft extremity. This configuration enables the user 2 to ski backwards as well as forwards, for example while doing figure skiing or ski ballet. In combination with the coil spring, the dual ski shovels will enable a skilled user to perform combinations of jumping, bouncing, turning and spinning maneuvers.

Figure 8:
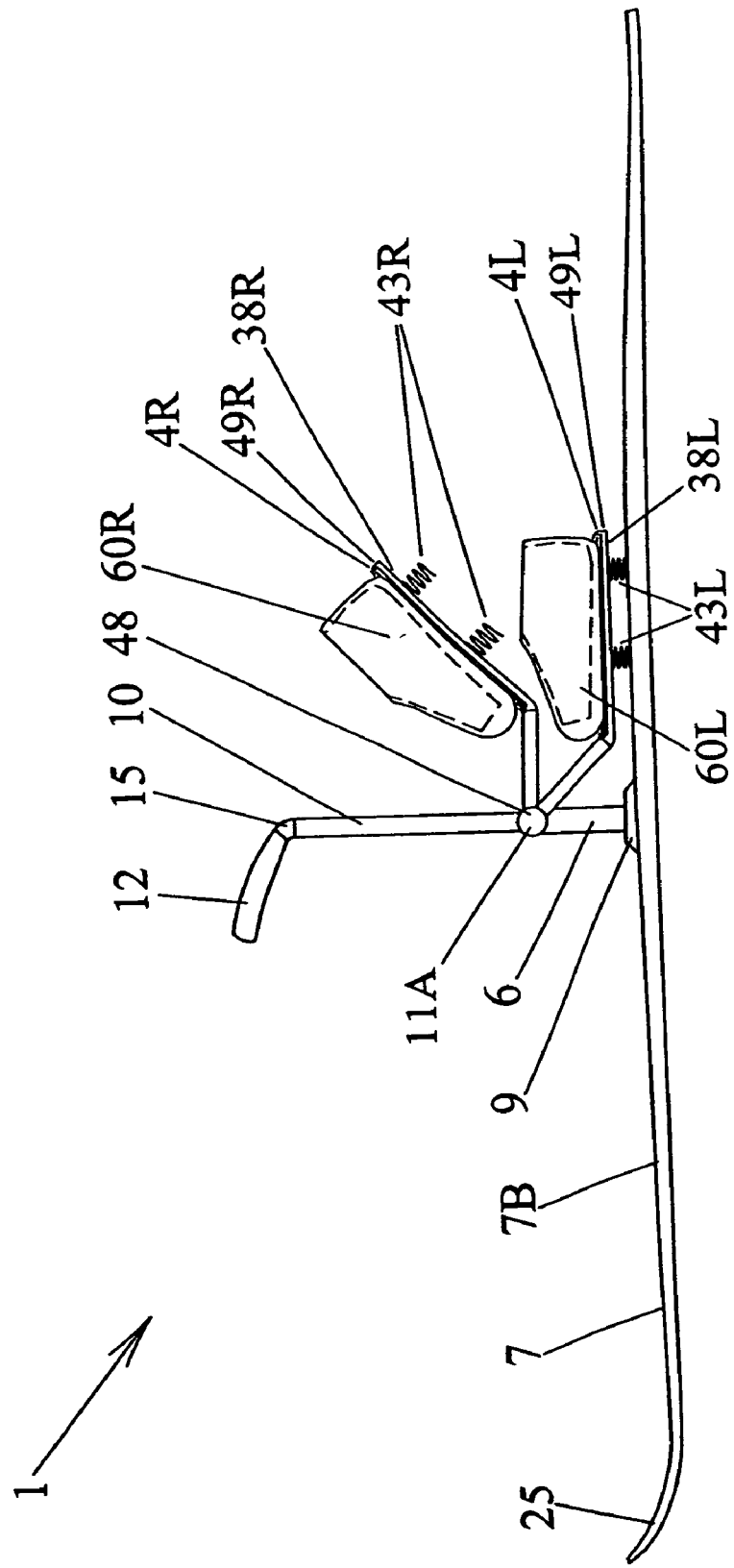
FIG. 8 shows a side view of another preferred embodiment of a pogo-ski.

FIG. 8 shows a side view of another preferred embodiment of a pogo-ski 1, wherein the ski 7 is a ski-jumping type of ski 7B. A short lower post 6 is attached to the ski 7 by lower post connecting means 9, and a short upper post 10 is mounted thereon by a hinged upper post connecting means 11A. Handhold means 12 are shown connected by handhold connection means 15 to the upper post 10. The left foot support 4L and right foot support 4R are shown in relatively displaced configurations, where these include respectively a left foot plate 38L and right foot plate 38R which are both connected by hinged attachment means 48 to the top of the lower post 6. The left coil springs 43L and right coil springs 43R comprise spring means for providing a spring force with a vertical component between the ski 7 and the left foot support 4L and the right foot support 4R respectively. The left foot support 4L includes left binding means 49L for detachably binding the user's left shoe/boot 60L to the left foot plate 38L, and the right foot support 4R includes right binding means 49R for detachably binding the user's right shoe/boot 60R to the right foot plate 38R. The combination of features described for this embodiment enable a ski jumper user to ski down a ski jump ramp in a crouched position, then jump forcefully taking advantage of the springs, and then adopt a desired forward leaning body configuration for the flying portion of the ski jump maneuver. Variants of the embodiment of FIG. 8 can be used for downhill skiing or other types of skiing besides ski jumping.

Figure 9:
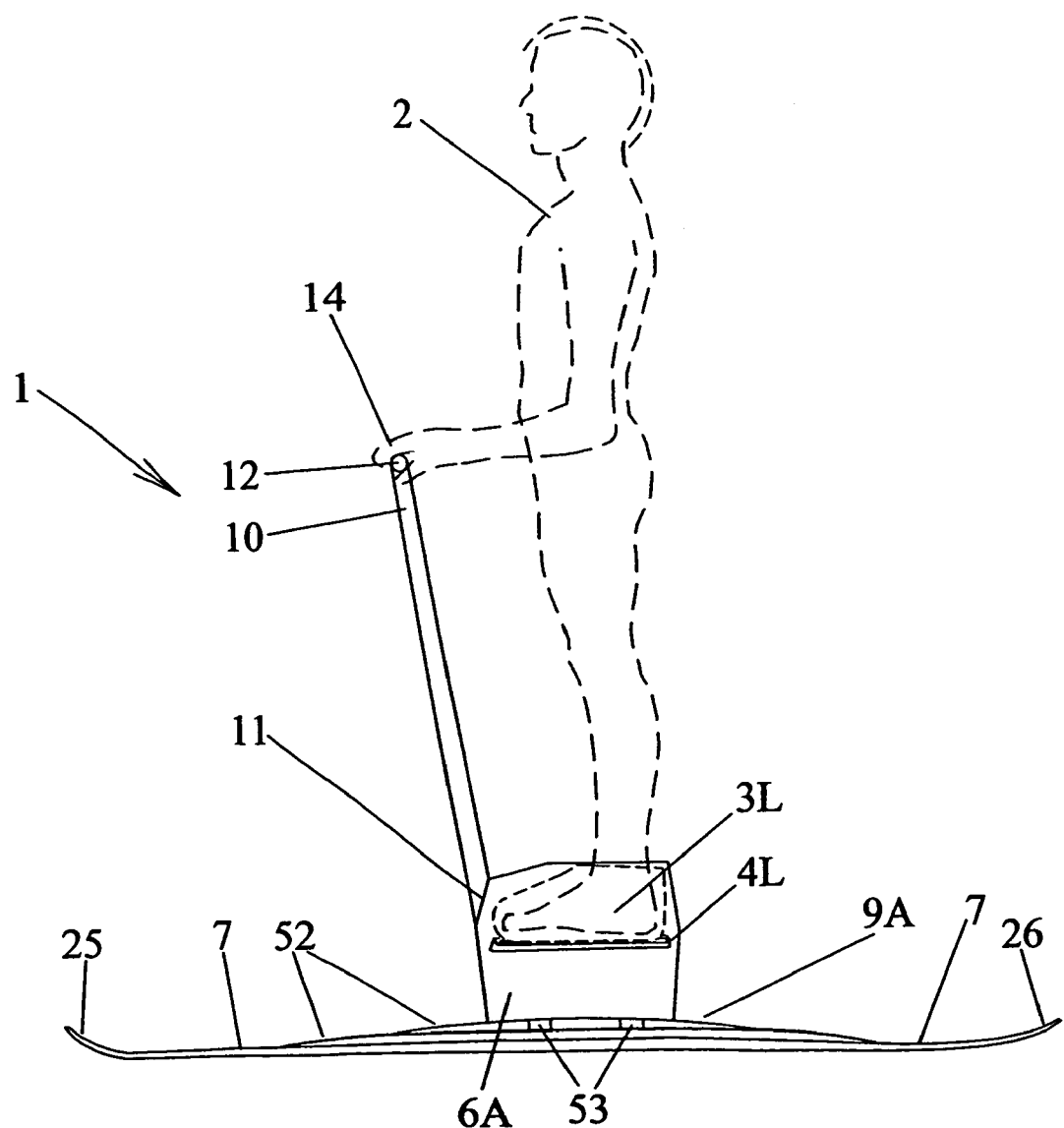
FIG. 9 shows a side view of another preferred embodiment of a pogo-ski.

FIG. 9 shows a side view of another preferred embodiment of a pogo-ski 1, wherein the lower post 6A is of noncircular cross-section, or more specifically of an elongated longitudinal or plate-like configuration, as illustrated. The lower post connecting means 9A here includes a spring (leaf spring 52) acting between the lower post 6A and the ski 7, as well as a damper 53 acting between the lower post 6A and the ski 7. The pogo-ski 1 of FIG. 9 therefore includes spring means in at least one of the lower post connecting means, the left foot support connecting means, the right foot support connecting means and the upper post connecting means, for enabling the user to deliberately and repeatedly bounce while skiing on the pogo-ski 1. The illustrated ski 7 in this embodiment has substantially no camber, and is fitted with both a forward ski shovel 25 and an aft ski shovel 26.

Figure 10:
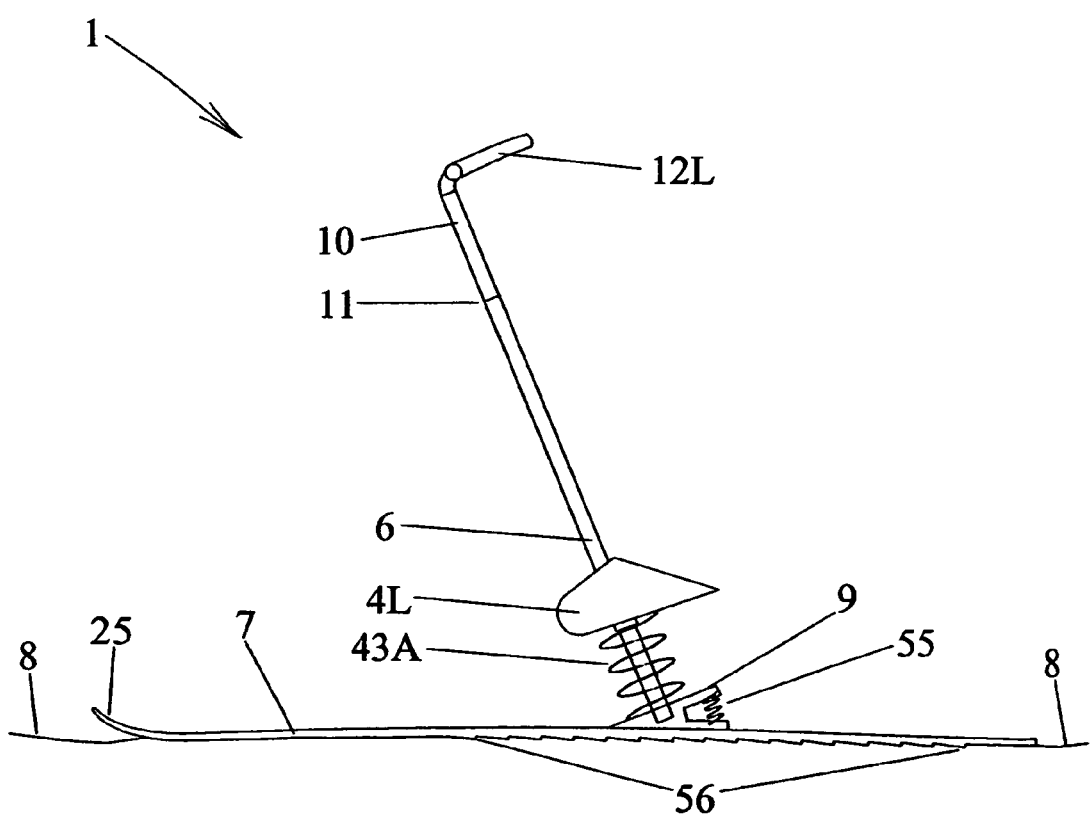
FIG. 10 shows a side view of another preferred embodiment of a pogo-ski.

FIG. 10 shows a side view of another preferred embodiment of a pogo-ski 1. In this embodiment the lower post connecting means 9 provides a connection with variable angle (through angle-changing fitting means 55) between said ski 7 and said lower post 6. The preferred angle involves some combination of upward and forward components for the orientation of the lower post 6 relative to the ski 7. This embodiment also features spring means 43A between said left foot support 4L and said right foot support (not seen in this view) on one hand, and said ski 7 on the other hand, for enabling the user to exert a force on the ski 7 by stamping down with force on at least one of the left foot support 4A and the right foot support, where the spring means 43A is aligned at an angle upward and forward from the ski 7 such that said force has a backward force component acting on the ski 7, and further comprising surface-engaging edge means 56 on the bottom of the ski 7 for producing a forward thrust force on the ski 7 in reaction to an aft force imparted to the sliding surface 8 by said backward force component.

Figure 11:
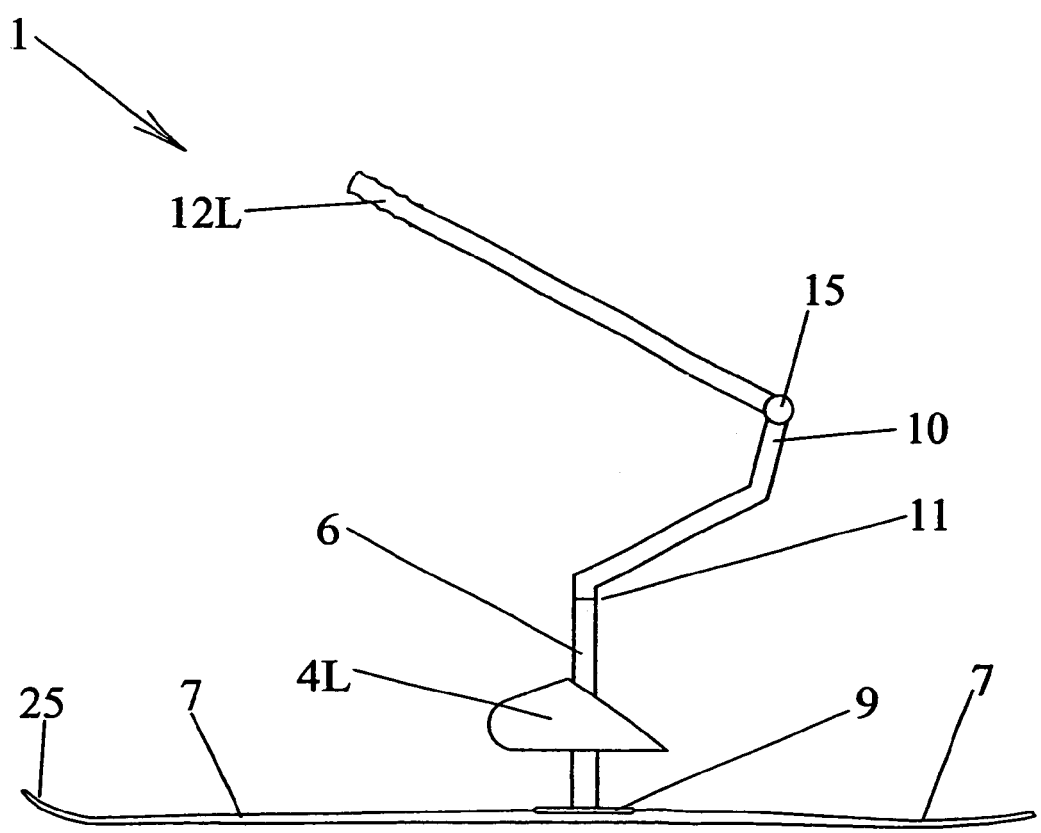
FIG. 11 shows a side view of another preferred embodiment of a pogo-ski.

FIG. 11 shows a side view of another preferred embodiment of a pogo-ski 1, wherein the upper post 10 is designed to be located behind the user 2 rather than in front of the user 2. As illustrated, the left hand hold means 12L is mounted on a curved member extending to the left and forward from the hand hold connection means 15 mounted on top of the upper post 10, behind the user's location. A corresponding right hand hold means is not visible in this view.

Figure 12:
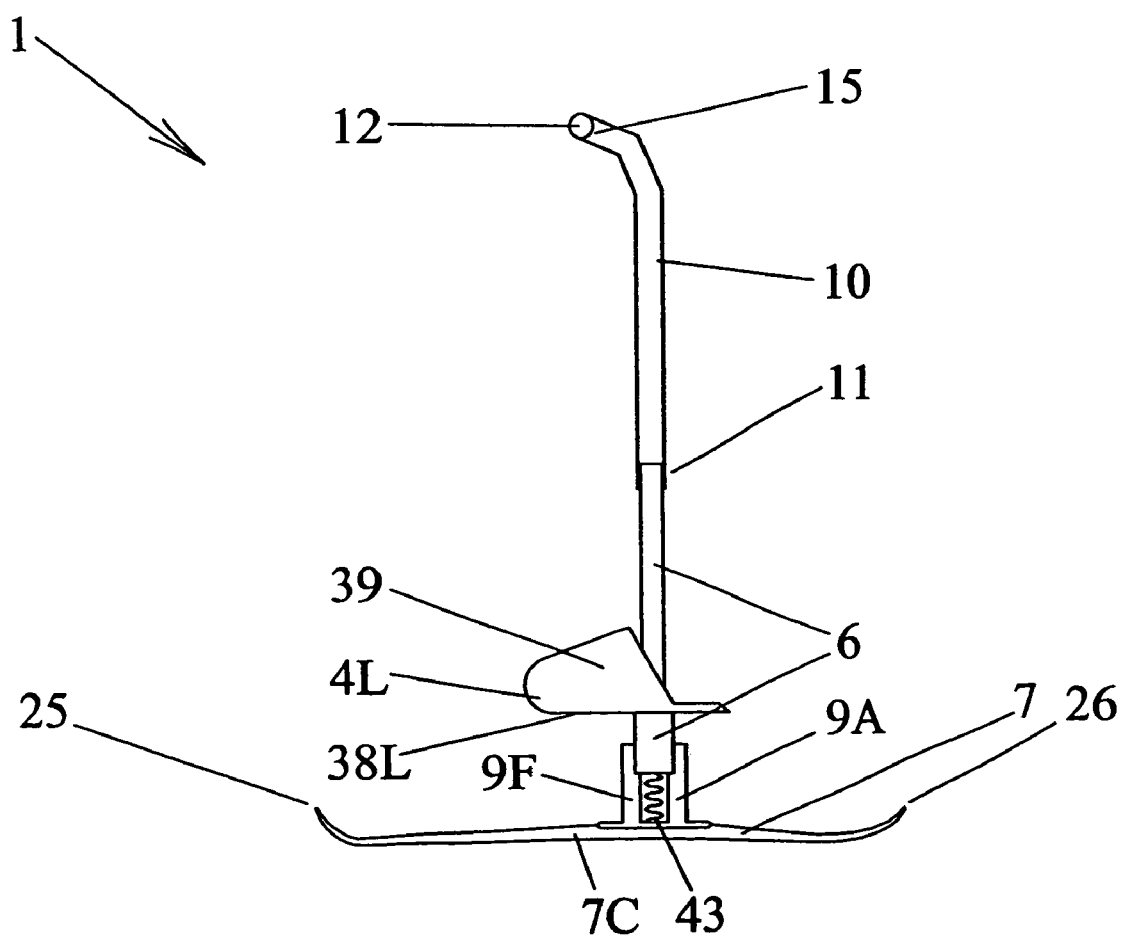
FIG. 12 shows a side view of another preferred embodiment of a pogo-ski.

FIG. 12 shows a side view of another preferred embodiment of a pogo-ski 1, wherein the ski 7 is a short ski 7C. In this embodiment the short ski 7C is illustrated with a forward ski shovel 25; thus the ski 7 has a ski shovel 25 at its forward extremity. In this embodiment the short ski 7C is also illustrated with an aft ski shovel 26; thus the ski 7 has a ski shovel 26 at its aft extremity. This embodiment is also shown with a forward lower post connecting means 9F and an aft lower post connecting means 9A, which are each post like structures projecting upward from the short ski 7C, and which slidably connect and engage with the lower post 6. A spring 43 is also shown between the lower end of the lower post 6 and the upper surface of the short ski 7C. The lower post 6 supports the left foot support 4L with a left foot plate 38L and foot enclosing surfaces 39, as well as the corresponding right side elements not shown in this view. Handhold means 12 are connected by handhold connection means 15 to an upper post 10, which upper post 10 is connected by upper post connecting means 11 to the lower post 6.

Figure 13A:
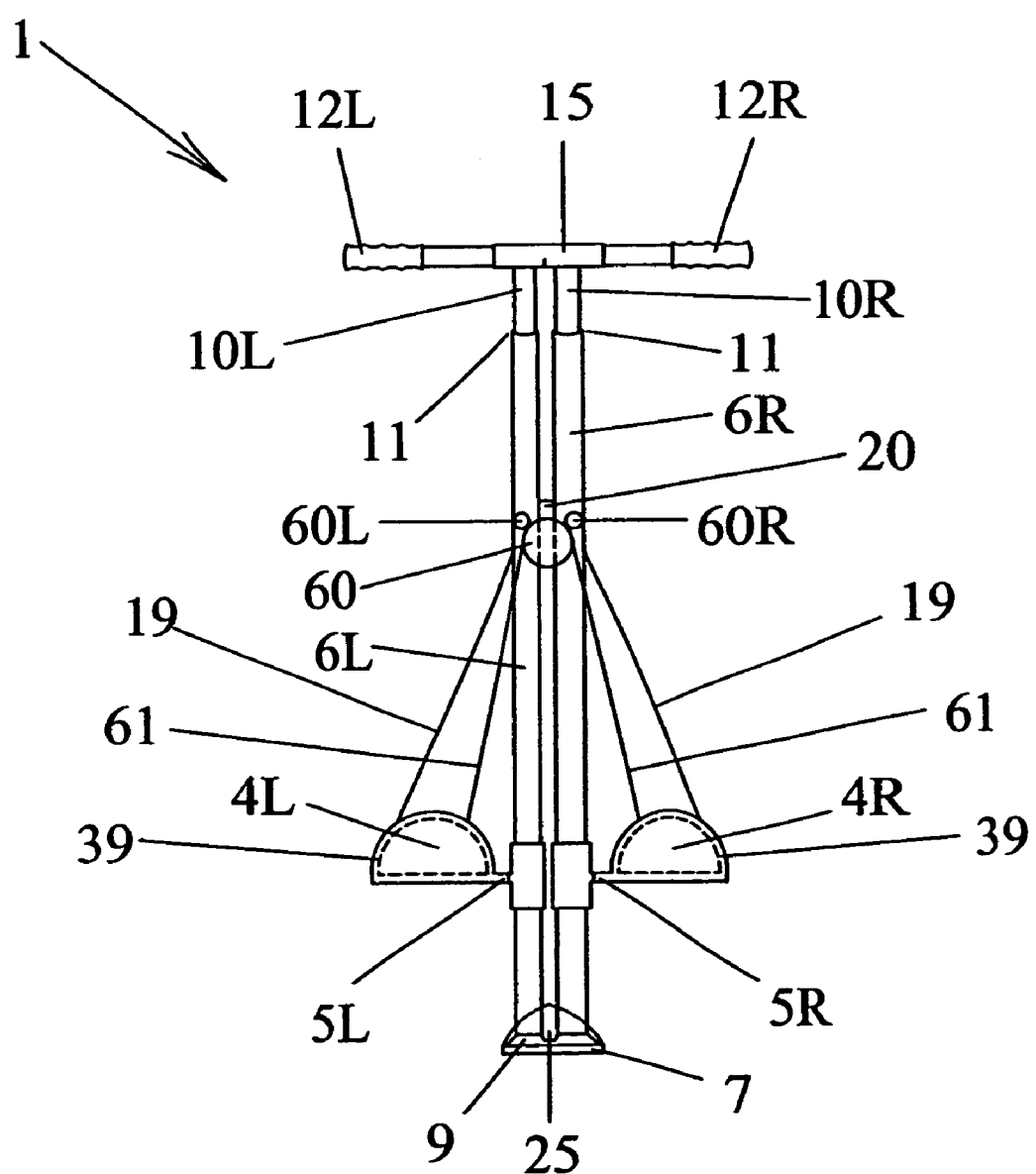
FIGS. 13A, 13B and 13C show aft views of other preferred embodiments related to the embodiment of FIG. 3.
Figure 13B:
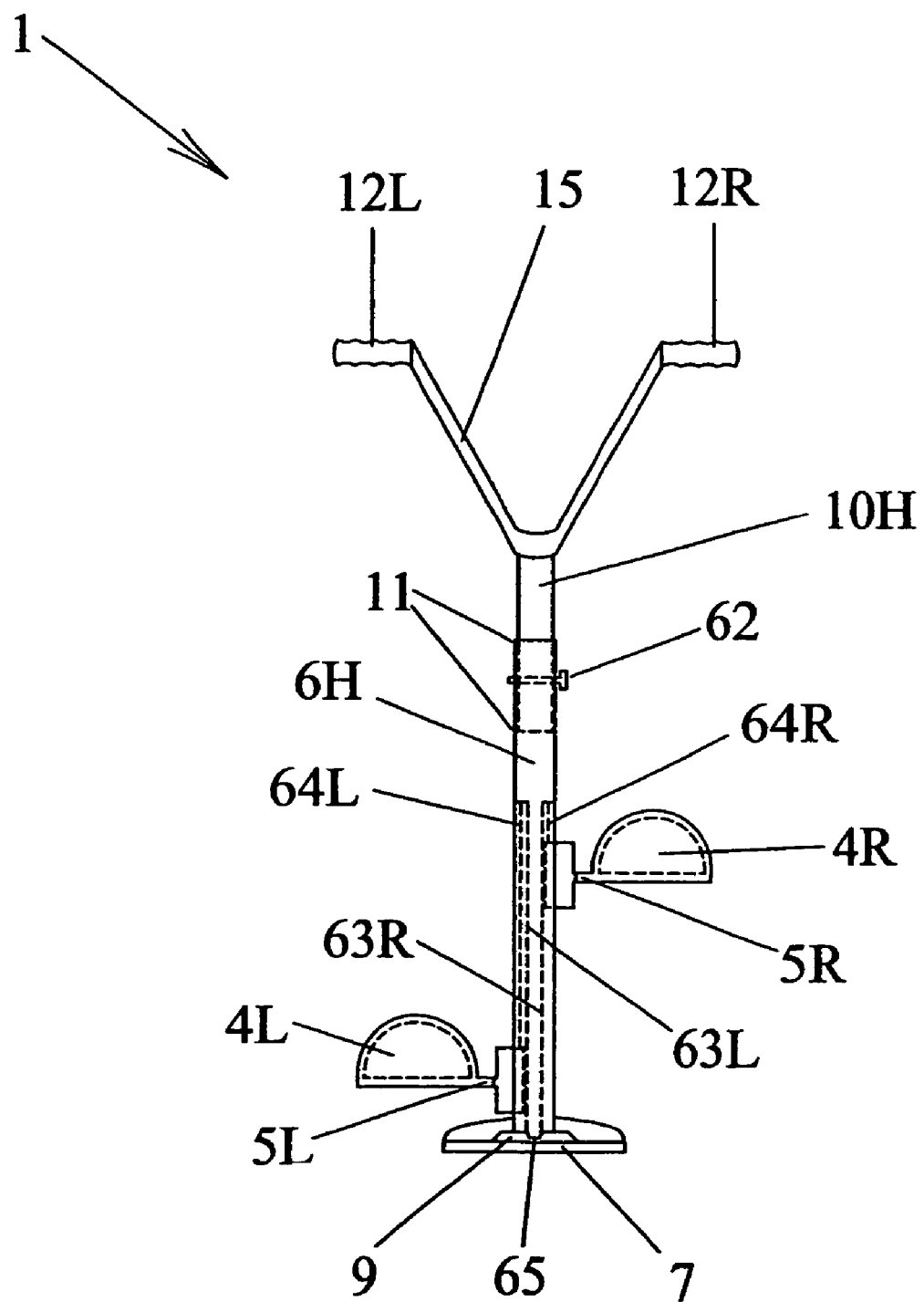
Figure 13C:
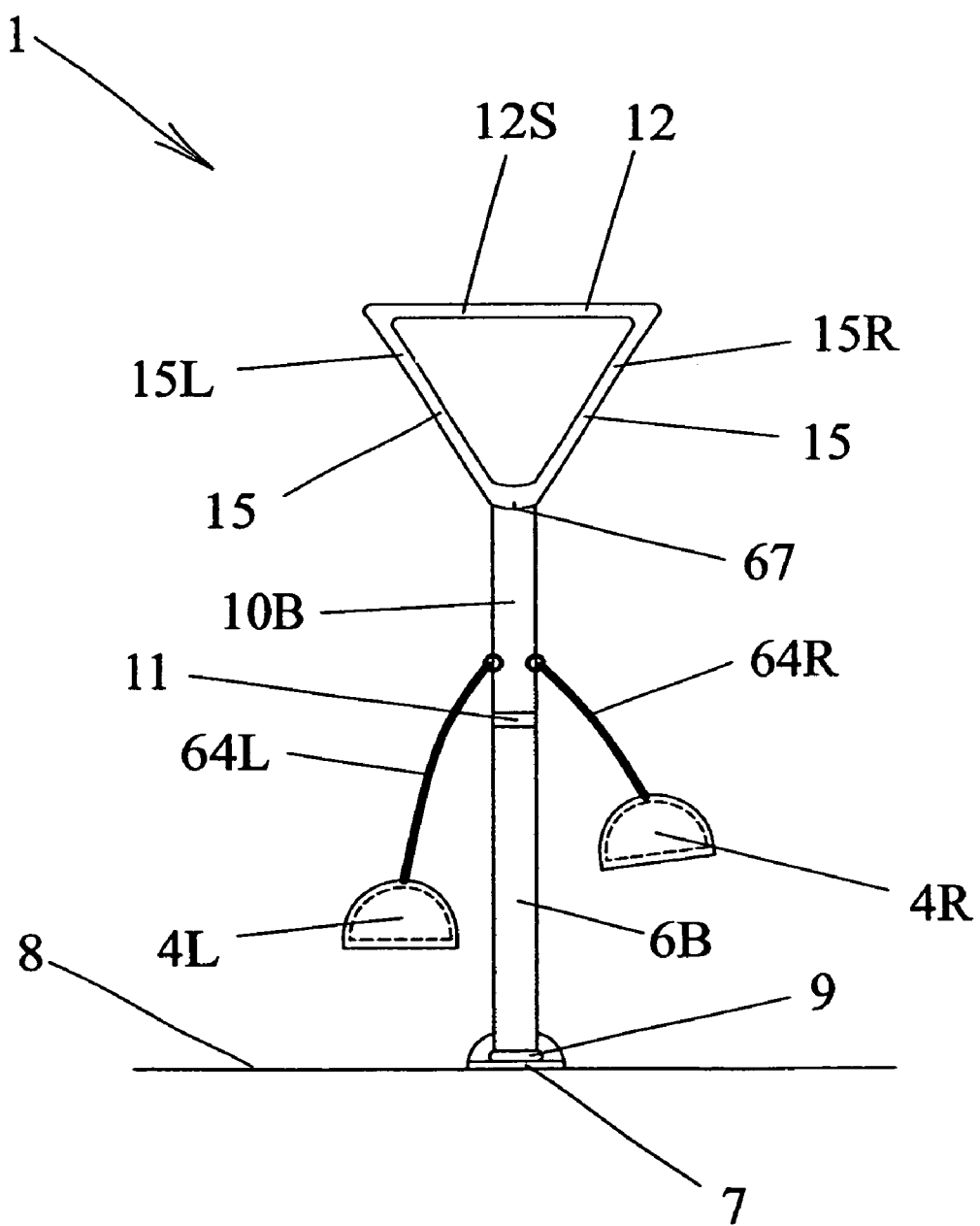

FIGS. 13A, 13B and 13C show aft views of other preferred embodiment of a pogo-ski related to the embodiment of FIG. 3. FIG. 13A shows an aft view of an embodiment of a pogo-ski 1 similar to that of FIG. 3, but provided with an aft linking cable 61 looped around a primary aft pulley 60 and guided around that by a right aft guide roller 60R and left aft guide roller 60L at a location aft of the right lower post 6R and left lower post 6L, in addition to the linking cable 19 looped around the primary pulley 20 at a location forward of the right lower post 6R and left lower post 6L. Also, in the embodiment of FIG. 13A the linking cable 19 and aft linking cable 61 are both connected at their lower left and right termini to the foot enclosing surfaces 39 associated with the left foot support 4L and right foot support 4R, respectively. The linking cable 19 and aft linking cable 61 will preferably have some elasticity or stretch and at least a minimal amount of damping, to allow some at least minimally damped pitching rotation of the left and right foot supports, and some at least minimally damped concurrent up/down translation of the left and right foot supports, in addition to the one up & other down motions of the left foot support 4L and right foot support 4R that would be permitted even if the linking cables were fully inelastic and undamped.

The embodiment illustrated in FIG. 13A provides a pogo-ski 1, wherein said left foot support connecting means 5L and said right foot support connecting means 5R coupled together (through said left foot support 4L and its foot enclosing surfaces 39, right foot support 4R and its foot enclosing surfaces 39, and linking cable 19 and aft linking cable 61) provide at least one spring in the connection between said left foot support 4L and said right foot support 4R on the one hand, and said lower post (6L and 6R) on the other hand, with a spring element in the linking cable 19 looped around the primary pulley 20 attached to the lower post (6L and 6R) and a spring element in the aftlinking cable 61 looped around the primary aft pulley 60. The embodiment illustrated in FIG. 13a provides a pogo-ski 1, wherein said left foot support connecting means 5L and said right foot support connecting means 5R coupled together (through said left foot support 4L and its foot enclosing surfaces 39, right foot support 4R and its foot enclosing surfaces 39, and linking cable 19 and aft linking cable 61) provide at least one damper in the connection between said left foot support 4L and said right foot support 4R on the one hand, and said lower post (6L and 6R) on the other hand, with a damper element in the linking cable 19 looped around the primary pulley 20 attached to the lower post (6L and 6R) and a damper element in the aft linking cable 61 looped around the primary aft pulley 60.

FIG. 13B shows an aft view of a variant embodiment of a pogo-ski 1 wherein a hexagonal cross-section lower post 6H is attached to the ski 7 by lower post connecting means 9 incorporating a detachable connection fitting 65. A hexagonal cross-section upper post 10H is telescopically connected with the hexagonal cross-section lower post 6H at upper post connecting means 11 which includes a locating bolt 62 which engages lined-up holes in said upper and lower posts, and can engage different holes to locate the hexagonal cross-section upper post 10H and therefore the right handhold means 12R and left handhold means 12L at different levels or heights, because the right handhold means 12R and left handhold means are connected to the hexagonal cross-section upper post 10H through the illustrated bifurcated handhold connection means 15. Note that in variant embodiments quick-release latches or other mechanisms known from the prior art could be used in lieu of the locating bolt 62 for setting the height of the handhold means. In this embodiment the hexagonal cross-section lower post 6H is configured with a left track 63L on its left side and a right track 63R on its right side, along which tracks the left foot support connecting means 5L and the attached left foot support 4L, and right foot support connecting means 5R and the attached right foot support 4R, respectively are permitted to move up and down. The left foot support connecting means 5L is suspended by left bungee cord 64L and the right foot support connecting means 5R is suspended by right bungee cord 64R, which provide elastic force support to the user's left and right feet respectively, as well as at least some minimal damping of the vertical motions of the left and right foot supports.

The embodiment illustrated in FIG. 13B thus provides a pogo-ski 1, wherein the lower post connecting means 9 provides a detachable connection (65) between said ski 7 and said lower post 6H. The embodiment illustrated in FIG. 13b also provides a pogo-ski 1, wherein said left foot support connecting means 5L provides a spring (by left bungee cord 64L) in the connection between said left foot support 5L on the one hand, and said lower post 6H on the other hand. The embodiment illustrated in FIG. 13b also provides a pogo-ski 1, wherein said right foot support connecting means 5R provides a spring (by right bungee cord 64R) in the connection between said right foot support 5R on the one hand, and said lower post 6H on the other hand. The embodiment illustrated in FIG. 13b also provides a pogo-ski 1, wherein said lower post 6H is of noncircular cross-section. The embodiment illustrated in FIG. 13b also provides a pogo-ski 1, wherein said upper post 10H is of noncircular cross-section. The embodiment illustrated in FIG. 13b also provides a pogo-ski 1, wherein said upper post connection means 11 includes means for setting the height of said handhold means (12L, 12R) at different levels, including use of a locating bolt 62 as described.

FIG. 13C shows another variant embodiment of a pogo-ski 1, comprising in combination: a ski 7 providing means for sliding on a sliding surface 8, a lower post 6B (of rectangular cross-section in this embodiment) projecting upward from said ski 7 and connected to said ski by lower post connecting means 9, a left foot support 4L (of a stirrup type in the illustrated embodiment) connected by left foot support connecting means here comprising left bungee cord 64L to said pogo-ski 1 above said ski 7, which left foot support 4L serves as means for supporting the left foot of a user, a right foot support 4R (of a stirrup type in the illustrated embodiment) connected by right foot support connecting means here comprising right bungee cord 64R to said pogo-ski 1 above said ski 7, which right foot support 4R serves as means for supporting the right foot of the user, and handhold means 12 for being holdable by at least one hand of the user, which handhold means 12 are connected by handhold connection means 15 to an upper post 10B (of rectangular cross-section in this embodiment), which upper post 10B is connected by upper post connecting means 11 to the lower post 6B and which upper post 10B is substantially located above the lower post 6B. The bungee cords can stretch differentially as the user puts more weight on one or the other, with the left bungee cord shown more stretched in the illustration in FIG. 13C. This embodiment also permits the user to deliberately swing each foot support and bungee cord sideways or forward or backward when so desired.

The embodiment illustrated in FIG. 13C also provides a pogo-ski 1, wherein said lower post 6B is of noncircular cross-section. The embodiment illustrated in FIG. 13C also provides a pogo-ski 1, wherein said upper post 10B is of noncircular cross-section. The embodiment of FIG. 13c also illustrates a pogo-ski 1, wherein the handhold means 12 comprises a single bar 12S suitable for holding by either one or both hands of a user, and the handhold connection means 15 comprises left and right connecting rods 15L and 15R respectively going down from the left and right sides of the single bar 12S down to a connection fitting 67 on top of the upper post 10B.

Figure 14:
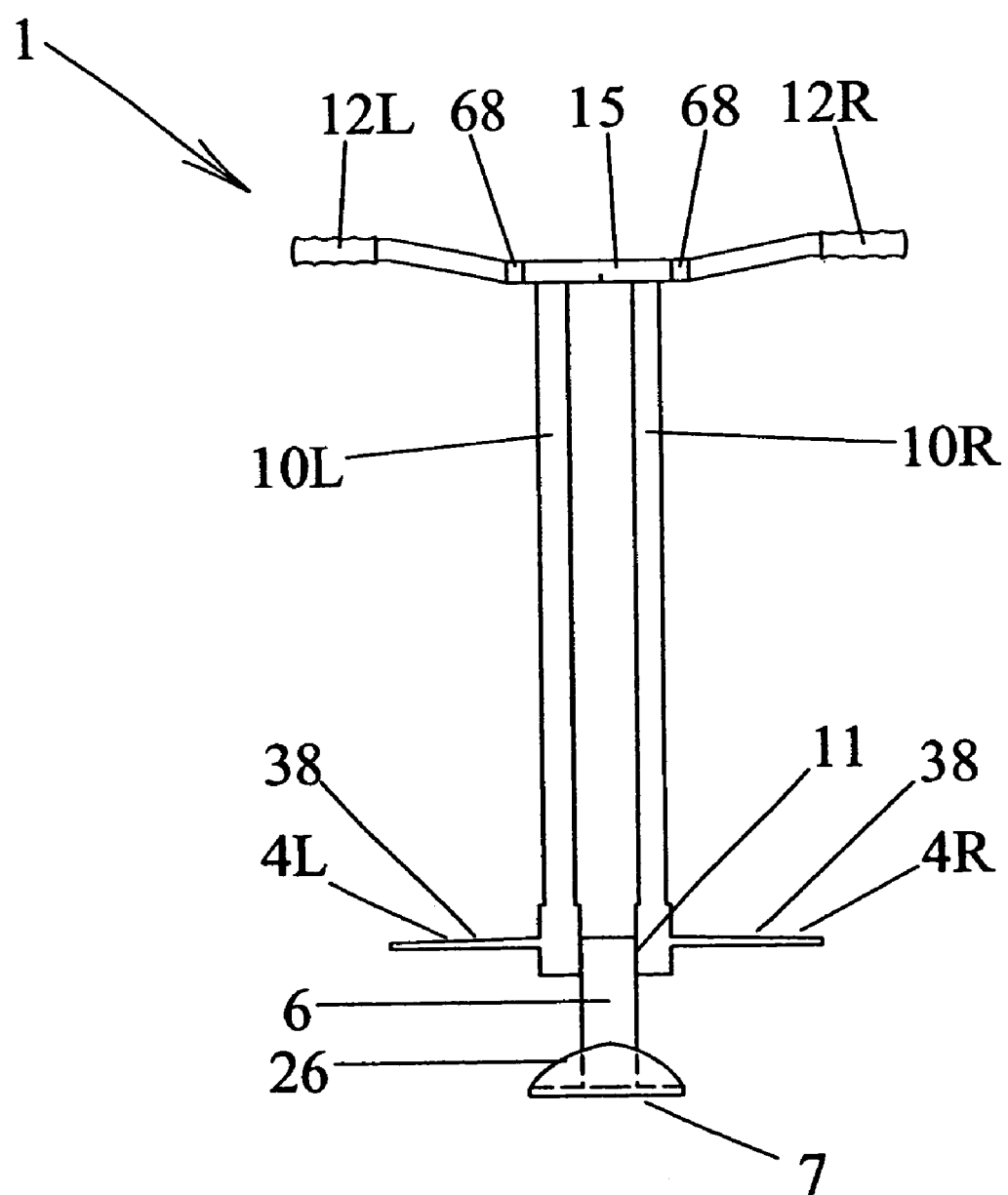
FIG. 14 shows an aft view of another preferred embodiment of the invention.

FIG. 14 shows an aft view of another preferred embodiment of the invention. This embodiment has a single lower post 6 above a wide ski 7 (such as a snowboard configuration, including an aft ski shovel 26), with upper post connecting means 11 connecting a left upper post 10L and right upper post 10R to the lower post 6. As illustrated, a left foot support 4L and right foot support 4R each include a foot plate 38 on which the left and right foot of a user, respectively, can be supported. The illustrated pogo-ski 1 further comprises folding means 68 (here left and right hinges oriented approximately along a yaw axis) included in the handhold connecting means 15, for stowing the handlebars 12L and 12R in a configuration with reduced spacing between the left end of the left handlebar 12L and the right end of the right handlebar 12R.

Figure 15:
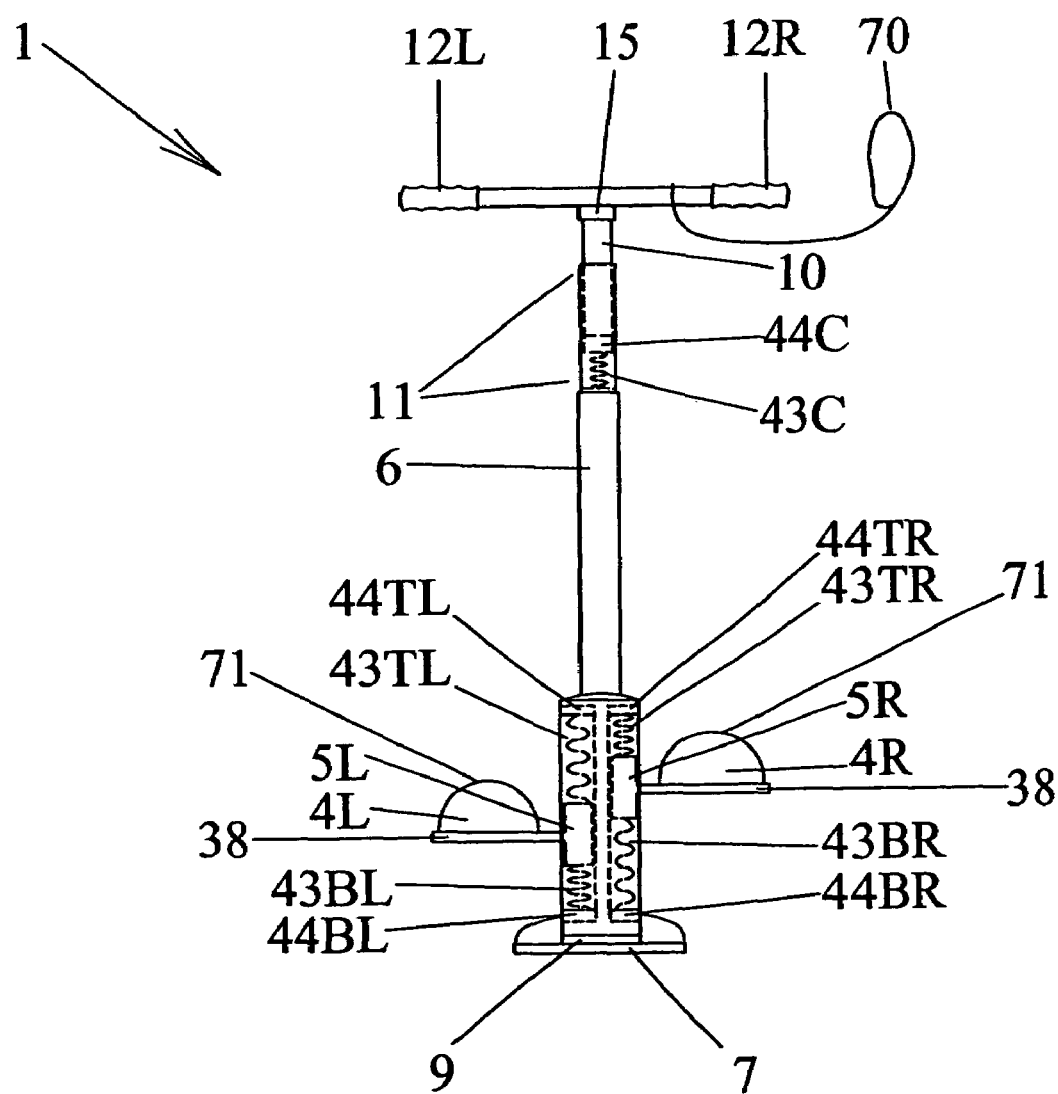
FIG. 15 shows an aft view of another preferred embodiment of the invention.

FIG. 15 shows an aft view of another preferred embodiment of the invention. In this embodiment a ski 7 supports a lower post 6 through lower post connecting means 9. The lower post 6 in turn supports an upper post 10 through upper post connecting means 11. The upper post connecting means includes a spring 43C and a damper 44C for allowing the upper post 10 to move up and down relative to the lower post 6, with a spring restoring force towards an equilibrium position, and with damping. The upper post 10 supports a left handlebar 12L and a right handlebar 12R through handhold connecting means 15. A safety strap 70 is shown connected to the handhold connecting means 15, which safety strap can be looped around the wrist of a user to keep the pogo-ski from becoming a "runaway ski" in case the user falls off the pogo-ski while skiing. It will be understood that alternate locations and configurations of safety strap(s) and other applicable safety equipment, including a user helmet, safety bindings etc., could be used based on known safety equipment and features from prior-art ski, snowboard, other snow and ice sports and water-skiing, and that these are highly recommended for inclusion by a manufacturer of pogo-skis, along with appropriate use literature and warnings & placards for hazards of all kinds. The pogo-ski of FIG. 15 has a left foot support 4L with left foot support connecting means 5L, and right foot support 4R with right foot support connecting means 5R. The left foot support connecting means 5L is shown including a spring 43TL and damper 44TL above it and connecting it with the lower post 6, and including a spring 43BL and a damper 44BL below it and connecting it with the lower post 6. Similarly, the right foot support connecting means 5R is shown including a spring 43TR and damper 44TR above it and connecting it with the lower post 6, and including a spring 43BR and a damper 44BR below it and connecting it with the lower post 6. Variant embodiments could have springs either above or below but not both with respect to the foot support connecting means. Similarly, variant embodiments could have dampers at one of either above, below or at the same level with respect to the foot support connecting means. The left foot support 4L and right foot support 4R are also shown with strap means 71 for holding a foot of the user, in this illustrated embodiment.

The embodiment of FIG. 15 also shows a pogo-ski 1, comprising in combination: a single ski 7 providing means for sliding on a sliding surface (not shown here but corresponding to sliding surface 8 of FIG. 1) and user interface means (i) providing a left foot support 4L and a right foot support 4R for supporting the feet of a user and (ii) providing handhold means 12L and 12R for being holdable by at least one hand of said user; wherein said user interface means comprises in combination: (i) said left foot support 4L located above said single ski 7 and connected to said single ski by left connection means 5L including means for permitting said left foot support 4L some measure of spring force affected vertical movement relative to said single ski (through the use of springs 43BL and 43TL in the illustrated embodiment): (ii) said right foot support 4R located above said single ski 7 and connected to said single ski by right connecting means 5R including means for permitting said right foot support some measure of spring force affected vertical movement relative to said single ski (through the use of springs 43BR and 43TR in the illustrated embodiment); and (iii) said handhold means 12L and 12R located above said single ski 7 and connected to said single ski 7 by handhold connecting means comprising post means including an upper post 10 and a lower post 6 for connecting said handhold means with said single ski, wherein said upper post 10 is connected by upper post connecting means 11 to said lower post 6 and wherein said upper post 10 is located substantially above said lower post 6, and wherein said lower post 6 is connected by lower post connecting means 9 to said single ski 7. FIG. 15 also shows an embodiment wherein said left connecting means 5L including means for permitting said left foot support 4L some measure of spring force affected vertical movement relative to said single ski 7, and said right connecting means 5R including means for permitting said right foot support 4R some measure of spring force affected vertical movement relative to said single ski 7, together contribute to bouncing means for enabling said user to deliberately and repeatedly bounce while skiing on said pogo-ski 1. Note also that the illustrated lower post connecting means 9 may incorporate detachable connecting means like prior art ski safety-release bindings.

The embodiment of FIG. 15 also shows a pogo-ski 1, comprising in combination: a ski 7 providing a laterally substantially contiguously located sliding means (here the illustrated bottom surface of the ski 7) below a user (not shown but corresponding to user 2 of FIG. 1) for said user to slide down a sliding surface (corresponding to sliding surface 8 of FIG. 1); a left foot support 4L located above and connected to said ski 7 by left coupling means 5L for permitting variable left spacing between said left foot support 4L and said ski 7 (through the use of springs 43BL and 43TL in the illustrated embodiment); a right foot support 4R located above and connected to said ski 7 by right coupling means 5R for permitting variable right spacing between said right foot support 4R and said ski 7 (through the use of springs 43BR and 43TR in the illustrated embodiment); and handhold means 12R and 12L for being holdable by at least one hand of said user, which handhold means are located above and connected to said ski 7. FIG. 15 also illustrates an embodiment of a pogo-ski 1 wherein said left coupling means 5L comprises left spring coupling means and wherein said right coupling means 5R comprises right spring coupling mean and wherein said left spring coupling means and said right spring coupling means are mutually independent and together enable said variable left spacing and said variable right spacing to vary independently of each other. Note that the left coupling means 5L and right coupling means 5R may optionally incorporate pitch-axis and/or roll-axis and/or yaw axis hinge means for permitting some rotational movement of the left foot support 4L and the right foot support 4R respectively. Note also that the illustrated configuration of a pogo-ski will permit a user to impart a rolling moment on said single ski 7 by shifting his or her weight laterally or by shifting the amount of his or her weight acting on said left foot support 4L as compared with the amount of his or her weight acting on said right foot support 4R or by applying a rolling moment to said handhold means 12R and 12L; and will permit a user to impart a yawing moment on said single ski 7 by pushing forward with a foot on either the left foot support 4L or the right foot support 4R or by applying a yawing moment to said handhold means 12R and 12L.

The embodiment of FIG. 15 also shows a pogo-ski 1, comprising in combination: a single snowboard 7 (wherein the wide illustrated single ski is a snowboard); handhold means 12L and 12R for being holdable by at least one hand of said user, which handhold means are connected to said snowboard 7 by a post 6; a left foot support 4L connected to said post by left post coupling means 5L for permitting said left foot support 4L to move to varying left height locations along said post (through the use of springs 43BL and 43TL in the illustrated embodiment); and a right foot support 4R connected to said post by right post coupling means 5R for permitting said right foot support 4R to move to varying right height locations along said post (through the use of springs 43BR and 43TR in the illustrated embodiment). The illustrated embodiment also shows the pogo-ski 1 wherein said left post coupling means 5L comprises left sprung coupling means and wherein said right post coupling means 5R comprises right sprung coupling means and wherein left sprung coupling means and said right sprung coupling means together facilitate unweighting of said snowboard 7 by said user for at least one of turn initiation or bouncing or other purposes. The illustrated embodiment also shows a pogo-ski 1 wherein said post 6 provides a connection between said snowboard 7 and said handhold means 12L and 12R which is substantially rigid in yaw and pitch.

The embodiment illustrated in FIG. 15 also provides a pogo-ski 1, wherein the left foot support connecting means 5L provides a spring (43TL and 43BL) in the connection between said left foot support 4L on the one hand, and the lower post 6 on the other hand. The embodiment illustrated in FIG. 15 also provides a pogo-ski 1, wherein the right foot support connecting means 5R provides a spring (43TR and 43BR) in the connection between said right foot support 4R on the one hand, and the lower post 6 on the other hand. The embodiment illustrated in FIG. 15 also provides a pogo-ski 1, wherein the left foot support connecting means 5L provides a damper (44TL and 44BL) in the connection between said left foot support 4L on the one hand, and the lower post 6 on the other hand. The embodiment illustrated in FIG. 15 also provides a pogo-ski 1, wherein the right foot support connecting means 5R provides a damper (44TR and 44BR) in the connection between said right foot support 4R on the one hand, and the lower post 6 on the other hand.

The embodiment illustrated in FIG. 15 also provides a pogo-ski 1, with spring means in at least one of said lower post connecting means 9, said left foot support connecting means 5L, said right foot support connecting means 5R and said upper post connecting means 11, for enabling a user to deliberately and repeatedly bounce while skiing on the pogo-ski 1. Finally, the embodiment illustrated in FIG. 15 also provides a pogo-ski 1, further comprising a safety strap 70 suitable for connecting the pogo-ski 1 to the user and suitable for preventing the pogo-ski 1 from sliding away from the user in the event that the user falls from said pogo-ski 1.

Figure 16:
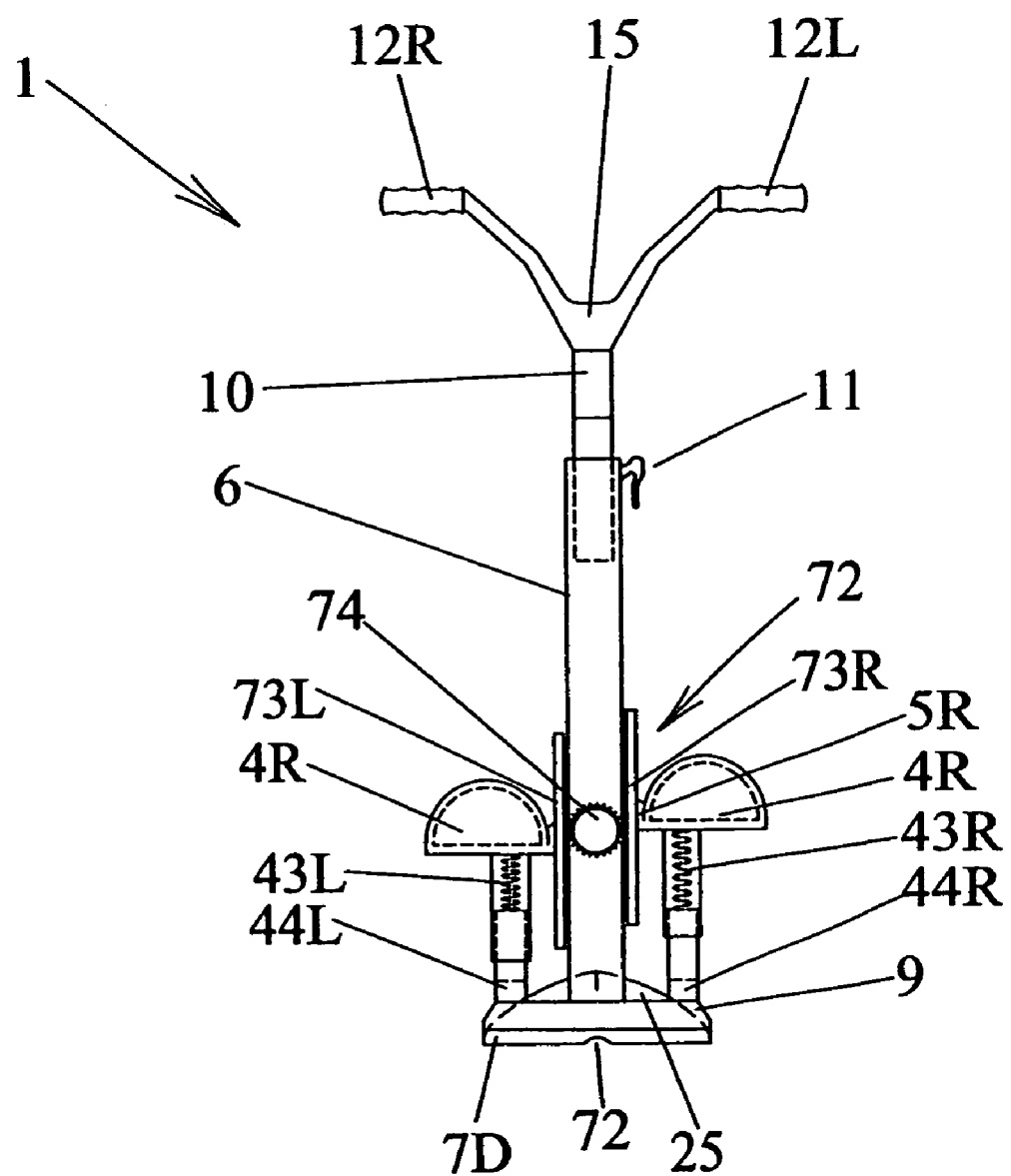
FIG. 16 shows an aft view of another preferred embodiment of the invention.

FIG. 16 shows an aft view of another preferred embodiment of a pogo-ski 1 wherein the ski is a snowboard 7D with a forward ski shovel 25 and a lower surface longitudinal groove 72. A lower post 6 is attached to the ski 7D by lower post connecting means 9. An upper post 10 is telescopically connected with the lower post 6 at upper post connecting means 11 which includes a quick-release latch which enables setting the location of the upper post 10 and therefore the right handhold means 12R and left handhold means 12L at different levels or heights, because the right handhold means 12R and left handhold means are connected to the upper post 10 through the illustrated bifurcated handhold connection means 15. In this embodiment, the upper post 10 includes a bendable section, which could be made of a thick-walled rubber cylinder with internal inflation or elevated pressure, or other similar construction.

The embodiment of FIG. 16 also shows spring means 43L for providing a spring force with a vertical component between the ski 7D and the left foot support 4L, and damper means 44L for providing a damping force with a vertical component between the ski 7D and the left foot support 4L. The embodiment of FIG. 16 also shows spring means 43R for providing a spring force with a vertical component between the ski 7D and the right foot support 4R, and damper means 44R for providing a damping force with a vertical component between the ski 7D and the right foot support 4R. The illustrated pogo-ski 1 includes translational motion linking means 72 for requiring an upward translational motion of said left foot support whenever said right foot support executes a downward translational motion and for requiring a downward translational motion of said left foot support whenever said right foot support executes an upward translational motion. The illustrated translational motion linking means 72 comprises rack and pinion means including a left rack 73L connected to at least one of said left foot support 4L and said left foot support connecting means 5L, and a right rack 73R connected to at least one of said right foot support 4R and said right foot support connecting means 5R, and a common pinion 74 which mates with both said left rack and said right rack.

Figure 17:
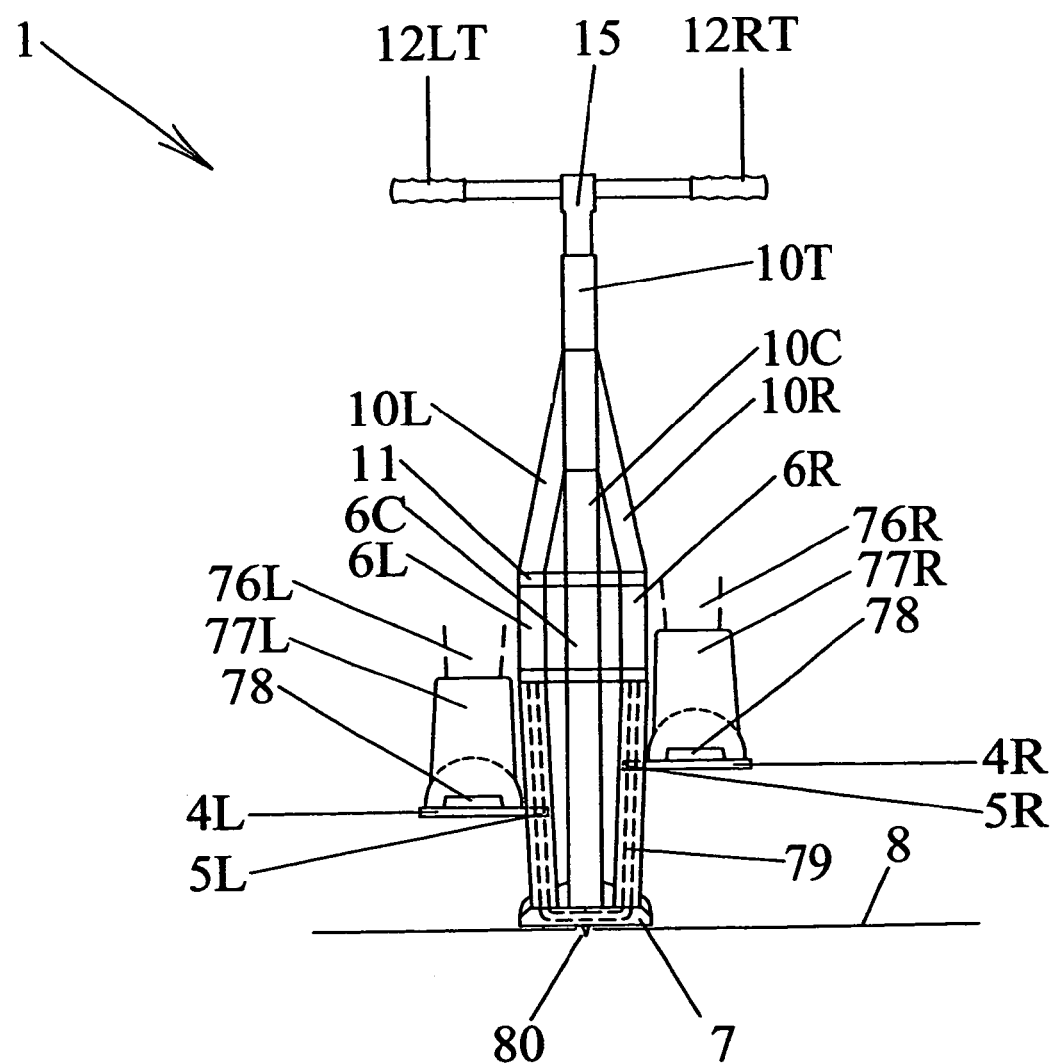
FIG. 17 shows an aft view of another preferred embodiment of the invention.

FIG. 17 shows an aft view of another preferred embodiment of the invention. This embodiment features a ski 7 supporting a lower post which comprises of a left lower post 6L, center lower post 6C and right lower post 6R, wherein this lower post in turn supports an upper post which comprises a left upper post 10L, center upper post 10C, right upper post 10R and top upper post 10T, through upper post connecting means 11. The upper post in turn supports handhold means including twistable left handhold means 12LT and twistable right handhold means 12RT through handhold connection means 15, as illustrated.

In this embodiment the pogo-ski 1 includes a left foot support 4L connected to the left lower post 6L by left foot support connecting means 5L, and right foot support 4R connected to the right lower post 6R by right foot support connecting means 5R. Also included is translational motion linking means for requiring an upward translational motion of said left foot support 4L whenever said right foot support 4R executes a downward translational motion and for requiring a downward translational motion of said left foot support 4L whenever said right foot support 4R executes an upward translational motion, which translational motion linking means includes a hydraulic linking tube 79 with left and right connections to the left foot support 4L and right foot support 4R respectively via left foot support connecting means 5L and right foot support connecting means 5R respectively, as illustrated. The hydraulic linking tube 79 contains hydraulic fluid of some suitable kind, which may also provide some spring and damping forces in the connection between the left foot support 4L and right foot support 4R.

The illustrated embodiment shows that said left foot support 4L and said right foot support 4R each include binding means 78 for permitting left and right boots 77L and 77R of the user to be securely attached to said left foot support 4L and said right foot support 4R, respectively. Safety bindings of a wide variety (e.g., with load-based release mechanisms) are known from the state of the art in ski technology, and versions of these derived and developed to be applicable to pogo-skis can be used to maximize usability and safety for a pogo-ski user. The left leg 76L and right leg 76R of the user are also visible above the left boot 77L and right boot 77R respectively.

The twistability of the handhold means in the embodiment of FIG. 17 provides means for the user to make a control input through the twist grip, in a manner analogous to the use of a twist grip for throttle control on a motorcycle. Thus the twistable left handhold means 12LT and twistable right handhold means 12RT provide hand control means integrated with said handhold means and suitable for said user to make a control input to said pogo-ski 1. In this embodiment the twist grips can be used for steering and/or braking control and/or binding release, including here specifically to control a movable steering keel/rudder which serves as steering means 80 for controllably engaging the sliding surface 8 so as to generate a desired yawing moment acting on said ski 7.

Figure 18:
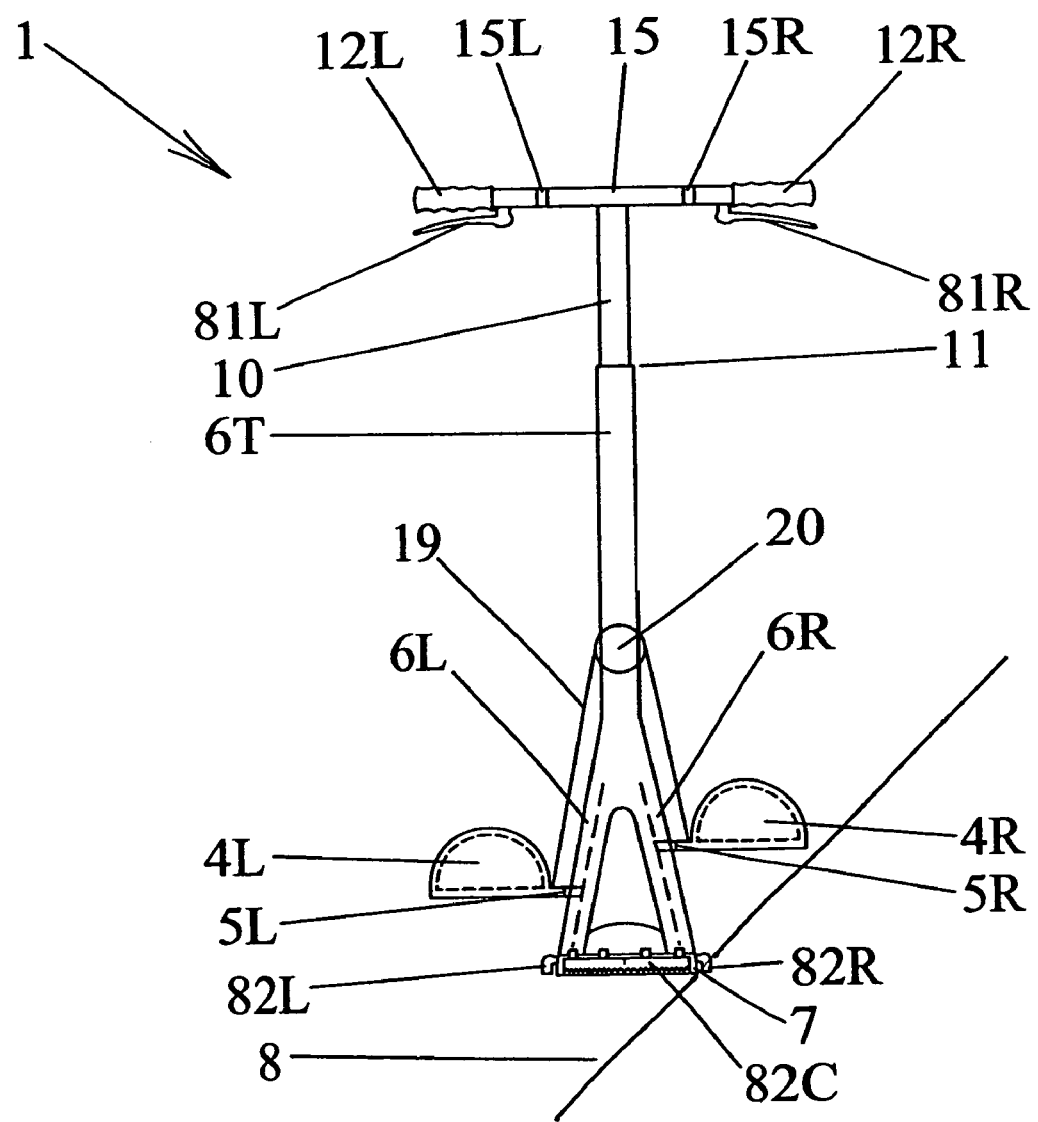
FIG. 18 shows an aft view of another preferred embodiment of the invention.

FIG. 18 shows an aft view of another preferred embodiment of the invention. A pogo-ski 1 is shown traversing a steep slope (sliding surface 8). The pogo-ski 1 has a wide ski 7 at its base, which ski 7 supports a lower post which comprises of a left lower post 6L, right lower post 6R and top portion lower post 6T, wherein this top portion lower post 6T in turn supports an upper post 10 with substantially circular cross-section, through upper post connecting means 11. The upper post connecting means 11 here includes a gas spring and damper (not shown), to allow sprung and damped vertical motion of upper post 10 and the handlebars 12L and 12R, relative to the lower post and ski 7. The upper post 10 in turn supports handhold means including left handhold means 12L and right handhold means 12R through handhold connection means 15, as illustrated. The handhold connection means 15 here include telescoping means 15L and 15R for varying the spacing between the left end of the left handlebar 12L and the right end of the right handlebar 12R. This telescoping means provides benefits for user comfort or preference, and for stowing said handlebars in a configuration with less width than for the skiing use configuration, and may use conventional locking or quick release fittings. Also shown in this embodiment are bicycle-brake-control-style hand control means 81L and 81R integrated with said handhold means 12L and 12R respectively, and suitable for the user to make a control input to the pogo-ski 1. The hand control means 81L and 81R can be used for steering and/or braking control and/or binding release, including here specifically to control braking control means 82C, 82L and 82R for increasing friction or drag acting on said pogo-ski 1 as it moves over the sliding surface 8. The illustrated braking control means here includes a downwardly deployable plate-type brake 82C at the aft end of the ski 7, and plural downwardly deployable tines 82L and 82R on the left and right sides of the ski 7, respectively. Drag anchors, plates or extensible protrusions which deploy from the bottom of the running surface of the ski 7 may be used in alternate variant embodiments.

In the embodiment of FIG. 18, the pogo-ski 1 further includes a left foot support 4L connected to the left lower post 6L by left foot support connecting means 5L, and right foot support 4R connected to the right lower post 6R by right foot support connecting means 5R. Also included is translational motion linking means for requiring an upward translational motion of said left foot support 4L whenever said right foot support 4R executes a downward translational motion and for requiring a downward translational motion of said left foot support 4L whenever said right foot support 4R executes an upward translational motion, which translational motion linking means includes linking cable 19 and pulley means 20, as illustrated. The pulley means 20 optionally includes torsional spring and damper means in this embodiment.

Figure 19:
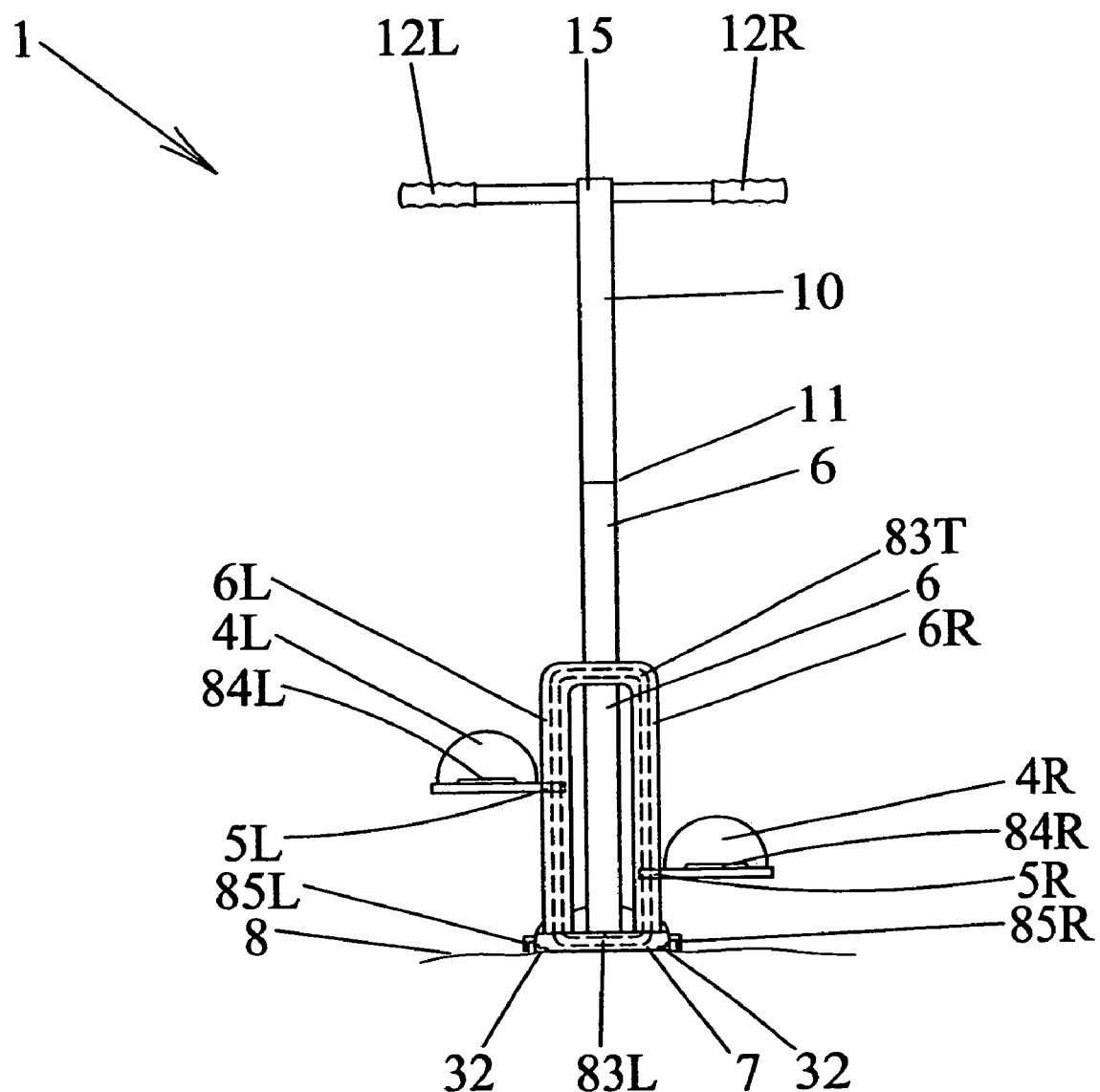
FIG. 19 shows an aft view of another preferred embodiment of the invention.

FIG. 19 shows an aft view of another preferred embodiment of the invention. A pogo-ski 1 is shown which has a wide ski 7 (such as, for example, a snowboard) at its base, which ski 7 has edges 32 at its lower side corners to support carved turns, traversing and braking. The ski 7 supports a lower post 6, and the top of the lower post 6 in turn supports an upper post 10 with a noncircular cross-section, through upper post connecting means 11. The upper post 10 in turn supports handhold means including left handhold means 12L and right handhold means 12R through handhold connection means 15, as illustrated.

In the embodiment of FIG. 19, the pogo-ski 1 further includes a left lower post 6L and right lower post 6R also supported by the ski 7, which left lower post 6L and right lower post 6R are separate from an located aft of the lower post 6. A left foot support 4L is connected to the left lower post 6L by left foot support connecting means 5L, and a right foot support 4R is connected to the right lower post 6R by right foot support connecting means 5R. Also included is translational motion linking means for driving an upward translational motion of said left foot support 4L whenever said right foot support 4R executes a downward translational motion and for driving a downward translational motion of said left foot support 4L whenever said right foot support 4R executes an upward translational motion, which translational motion linking means includes a pneumatic linking tube (here comprising both a lower pneumatic linking tube 83L and an upper pneumatic linking tube 83T) with left and right connections to the left foot support 4L and right foot support 4R respectively through left foot support connecting means 5L and right foot support connecting means 5R respectively. The pneumatic linking tube and pneumatic fluid therein will preferably provide some spring force and at least a minimal amount of damping force as well between the vertical motions of the left foot support 4L and right foot support 4R respectively.

In the embodiment of FIG. 19, the pogo-ski 1 further includes a left foot control input means 84L in said left foot support 4L, and a right foot control input means 84R in said right foot support 4R. These foot control input means may utilize foot pressure, toe input, or sensing of roll or yaw moments through the user's ankle to generate a control input for steering and/or braking. Thus in this embodiment the left foot control input means 84L and right foot control input means 84R serve as foot control means connected to at least one of said left foot support 4L or said right foot support 4R and suitable for said user to make a control input to said pogo-ski 1. The ski 7 is fitted on its sides with contollable, downward deployable drag/steering rods, specifically left controllable drag/steering rods 85L and right controllable drag/steering rods 85R, which together provide braking control means (through concurrent deployment) for increasing friction or drag acting on said pogo-ski 1 as it moves over the sliding surface 8, and which also provide steering means (through differential deployment) for controllably engaging the sliding surface 8 so as to generate a desired yawing moment acting on the ski 7.

Figure 20:
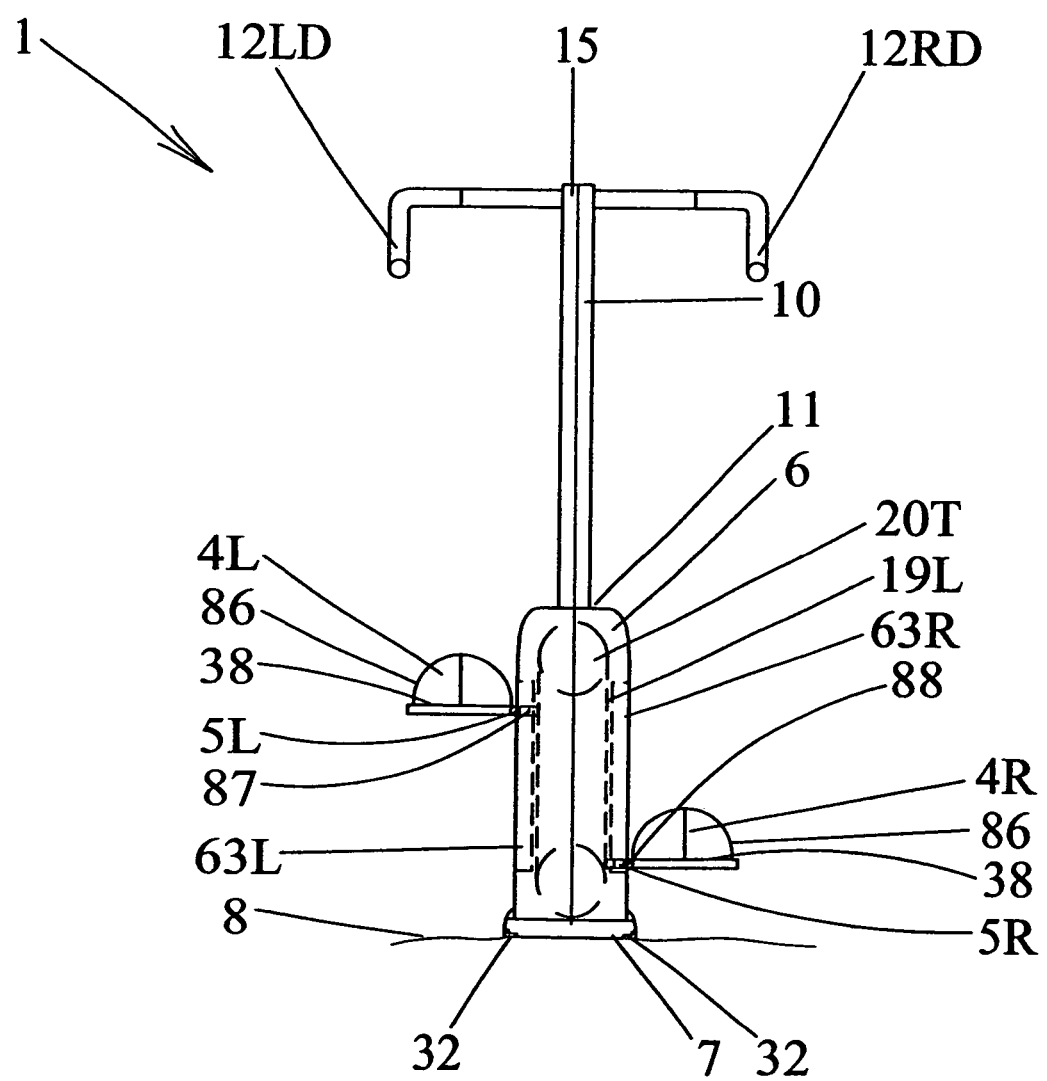
FIG. 20 shows an aft view of another preferred embodiment of the invention.

FIG. 20 shows an aft view of another preferred embodiment of the invention. A pogo-ski 1 is shown which has a ski 7 at its base. The ski 7 supports a lower post 6, and the top of the lower post 6 in turn supports an upper post 10, through upper post connecting means 11. The upper post 10 in turn supports handhold means including left handhold means and right handhold means here comprising left and right drop handlebars 12LD and 12RD respectively, through handhold connection means 15, as illustrated.

In this embodiment the lower post 6 is configured with a left track 63L on its left side and a right track 63R on its right side, along which tracks the left foot support connecting means 5L and the attached left foot support 4L, and right foot support connecting means 5R and the attached right foot support 4R, respectively are permitted to move up and down. The left foot support connecting means 5L and the right foot support connecting means 5R are connected by a looping link cable 19L which loops around top pulley 20T and bottom pulley 20B, which pulleys may optionally incorporate spring torque as well as at some torsional damping. The looping link cable 19L and the top pulley 20T and bottom pulley 20B together provide translational motion linking means for requiring an upward translational motion of said left foot support whenever said right foot support executes a downward translational motion and for requiring a downward translational motion of said left foot support whenever said right foot support executes an upward translational motion.

In the embodiment of FIG. 20 the left foot support 4L and the right foot support 4R each include a foot plate 38 on which the left foot and right foot of the user, respectively, can be supported. The left foot support 4L and the right foot support 4R also each include a toe clip 86 connected to the foot plate 38. These toe clips are similar to the toe clips used on the pedals of racing bicycles, and enable the user to exert an upward force on the pedal/foot support by pulling up on his/her leg. The toe clips will preferably be adjustable to fit different size shoes/boots of the user. This embodiment also shows that the left foot support connecting means 5L and the right foot support connecting means 5R include pitch-axis hinge means 87 for permitting pitch-axis rotation of said left foot support 4L and of said right foot support 4R; and that the left foot support connecting means 5L and the right foot support connecting means 5R include roll-axis hinge means 88 for permitting roll-axis rotation of said left foot support 4L and of said right foot support 4R (wherein the roll-axis hinge means 88 are preferably of limited permitted roll angles and sprung to return to a substantially horizontal roll angle).

Figure 21:
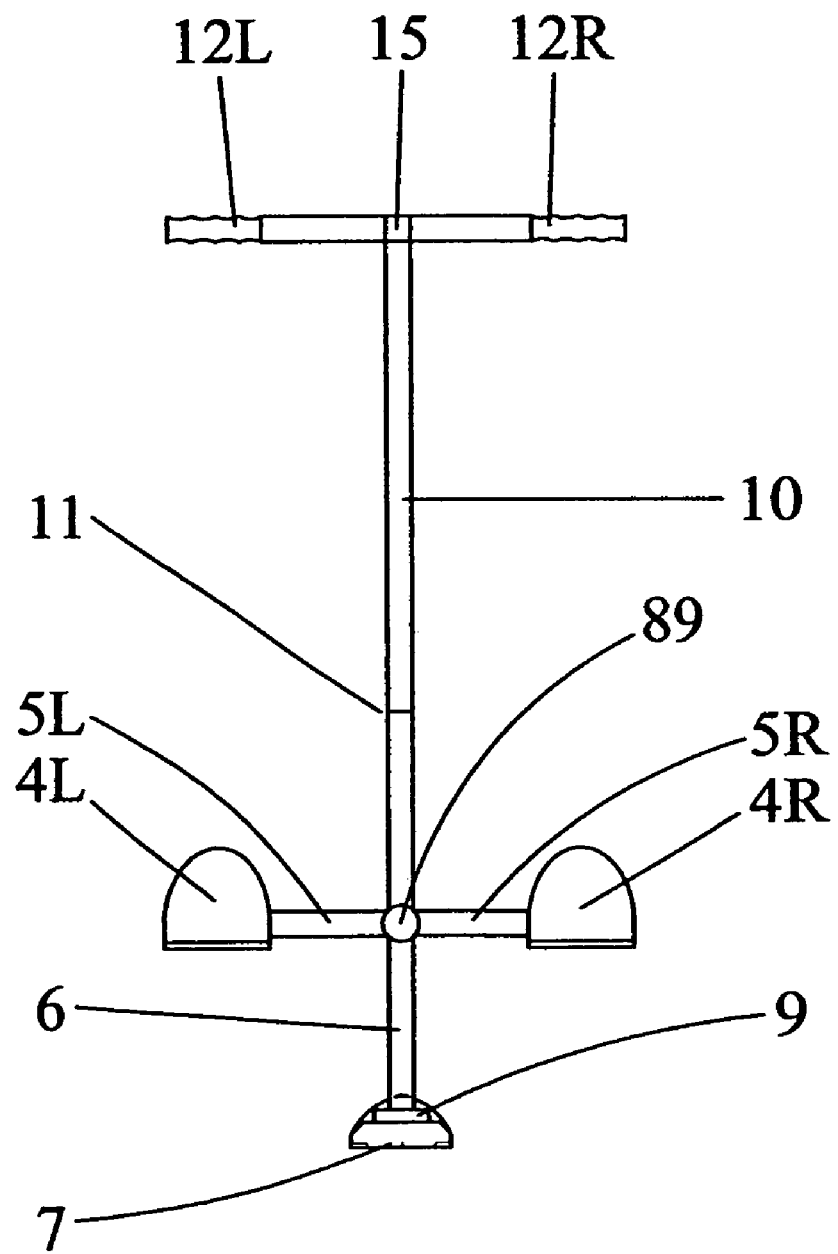
FIG. 21 shows an aft view of another preferred embodiment of the invention.

FIG. 21 shows an aft view of another preferred embodiment of the invention. A pogo-ski 1 is shown which has a ski 7 at its base. The ski 7 supports a lower post 6 through lower post connecting means 9, and the top of the lower post 6 in turn supports an upper post 10, through upper post connecting means 11. The upper post 10 in turn supports handhold means including left handhold means 12L and right handhold means 12R, through handhold connection means 15, as illustrated. In this embodiment the left foot support connecting means 5L connects the left foot support 4L to the lower post 6 through an included universal joint 89, and the right foot support connecting means 5R connects the right foot support 4R to the lower post 6 through the included universal joint 89. In an optional preferred version of this embodiment the left foot support connecting means 5L and the right foot support connecting means 5R comprise left and right sides of a single substantially rigid rod which is supported at its center by the included universal joint 89. In variant versions separate universal joints may be provided included with the left and right foot support connecting means 5L and 5R respectively.

Thus, in the embodiment of FIG. 21, the left foot support connecting means 5L and the right foot support connecting means 5R include pitch-axis hinge means (included in the universal joint 89) for permitting pitch-axis rotation of said left foot support 4L and of said right foot support 4R; and the left foot support connecting means 5L and the right foot support connecting means 5R include roll-axis hinge means (included in the universal joint 89) for permitting roll-axis rotation of said left foot support 4L and of said right foot support 4R; and the left foot support connecting means 5L and the right foot support connecting means 5R include yaw-axis hinge means (included in the universal joint 89) for permitting yaw-axis rotation of said left foot support 4L and of said right foot support 4R. In further variants of this embodiment the universal joint 89 may be replaced by a two-degree-of-freedom joint with just two of the pitch, roll and yaw degrees-of-freedom; and in still further variants of this embodiment the universal joint 89 may be replaced by a single-degree-of-freedom joint with just one of the pitch, roll and yaw degrees-of-freedom. Variants with modestly inclined pitch and/or roll and/or yaw axes are also feasible.

Figure 22:
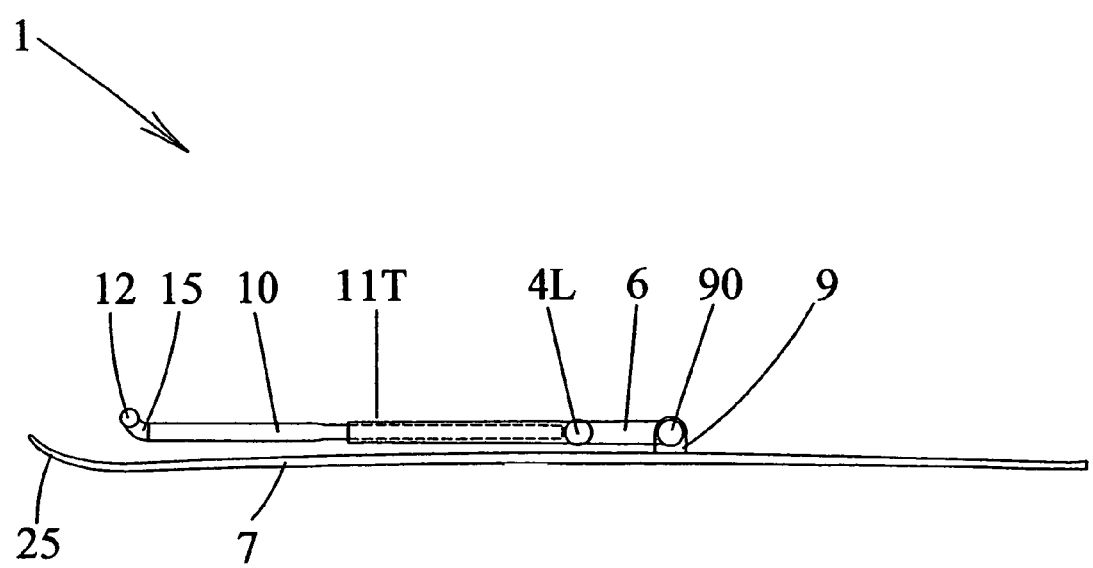
FIG. 22 shows a side view of a pogo-ski in a folded or stowage configuration.

FIG. 22 shows a side view of a pogo-ski 1 in a folded or stowage configuration. In this embodiment a ski 7 is illustrated with a forward ski shovel 25. The ski 7 supports a lower post 6 through lower post connecting means 9 which here incorporates folding hinge means 90 shown in a folded pogo-ski configuration. The folded pogo-ski configuration will be of utility when transporting the pogo-ski up a gondola or cable-car type ski lift, for example, and also while transporting the pogo-ski on a motor vehicle roof-rack or in a motor-vehicle trunk or pickup bed. The folding hinge 90 can be of any of a variety of types known from the past art, and will preferably include easy adjustability and positive locking in the folded configuration as well as in plural deployed configurations (i.e., with multiple lower post angles relative to the vertical when such plural deployed configurations are permitted). The lower post 6 in turn supports an upper post 10 through upper post connecting means 11T which includes a telescopically shortenable stowage position and quick-release means for use in conjunction with the folding of the post 6 at folding hinge means 90. The upper post 10 supports at least one handhold means 12 through handhold connecting means 15. The lower post supports foot supports, with a simple rod-like left foot support 4L visible in this view. Note that this type of foot support is similar to that used in prior art pogo-sticks.

Thus the embodiment of FIG. 22 provides a pogo-ski 1, wherein the lower post connecting means 9 provides a connection with variable angle between the ski 7 and the lower post 6. This embodiment also provides a pogo-ski 1, wherein the upper post connection means 11T includes a telescopic slidable connection between said upper post 10 and said lower post 6 and further comprises means for setting the height of the handhold means 12 at different levels.

Figure 23:
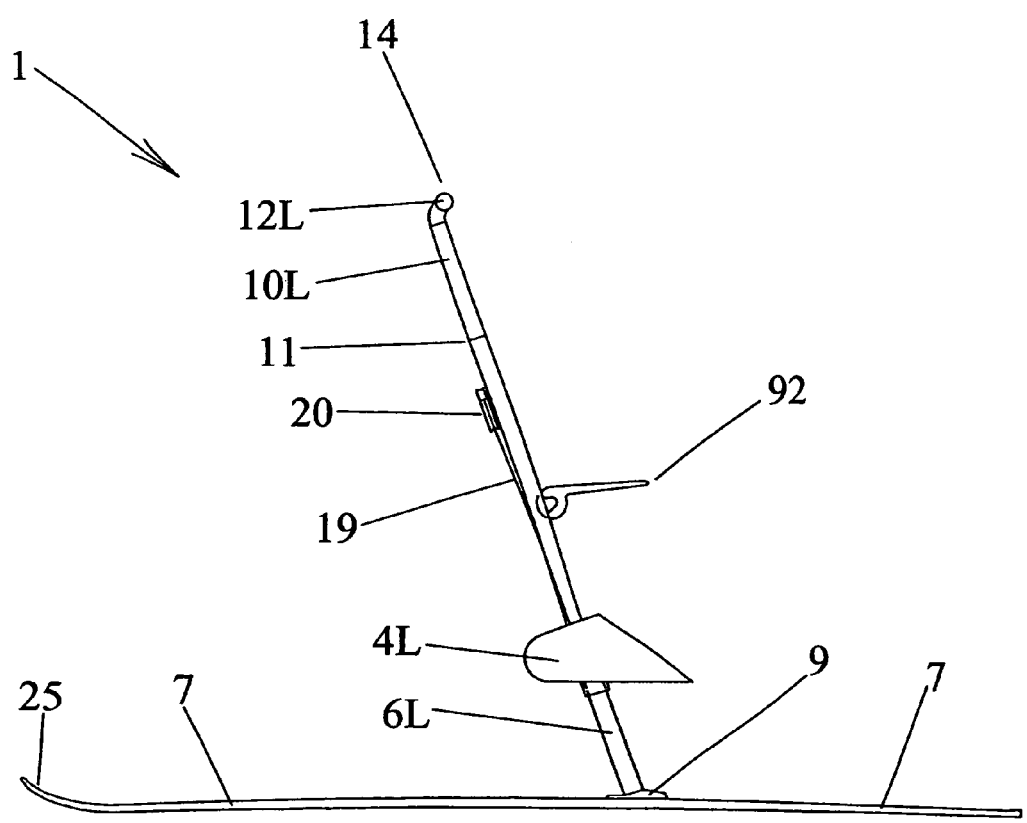
FIG. 23 shows a side view of a pogo-ski embodiment fitted with a chairlift-engagement fitting.

FIG. 23 shows a side view of a pogo-ski embodiment very similar to the embodiment of FIG. 1, but now fitted with chairlift-engagement means 92 here comprising a fitting with a deployable hangar rod with adjustable height, which can engage a supporting member of a chairlift such as the forward end of the chair surface between the user's legs, or possibly the safety bar of the chairlift. Thus this embodiment provides a pogo-ski 1, further comprising chairlift engagement means 92 for enabling said pogo-ski to hang from a chairlift while the user is riding on the chairlift in a seated posture.

Figure 24A:
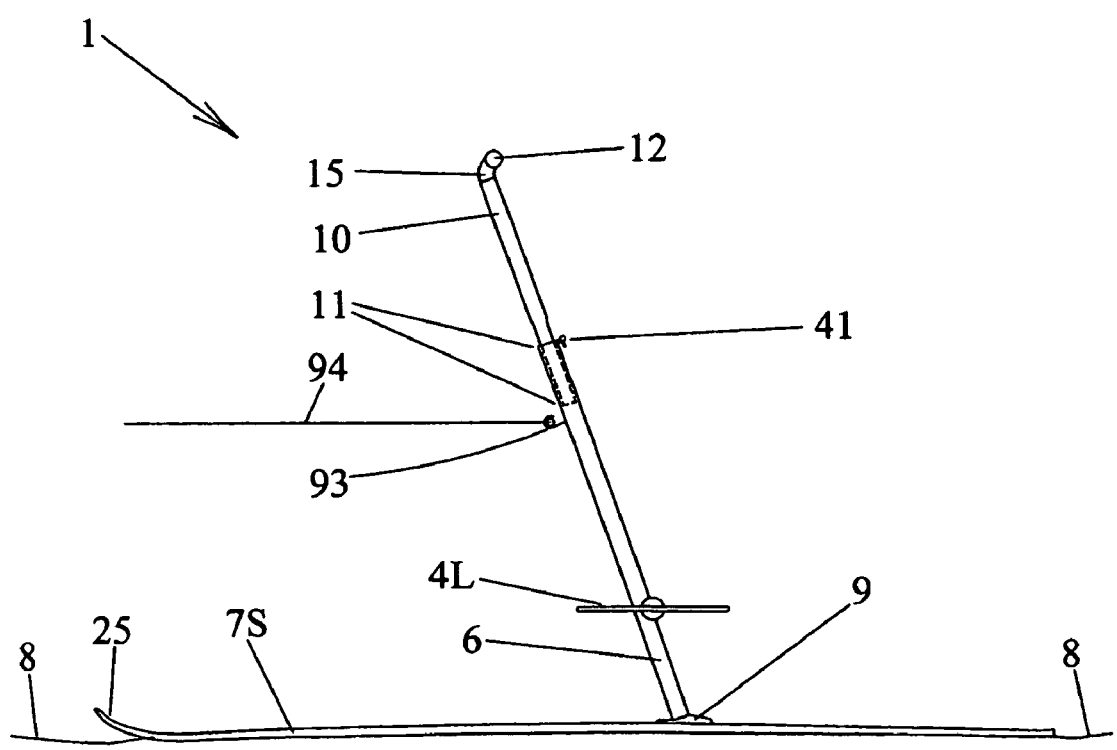
FIGS. 24A and 24B shows side views of a pogo-ski embodiment fitted with a tow cable fitting.
Figure 24B:
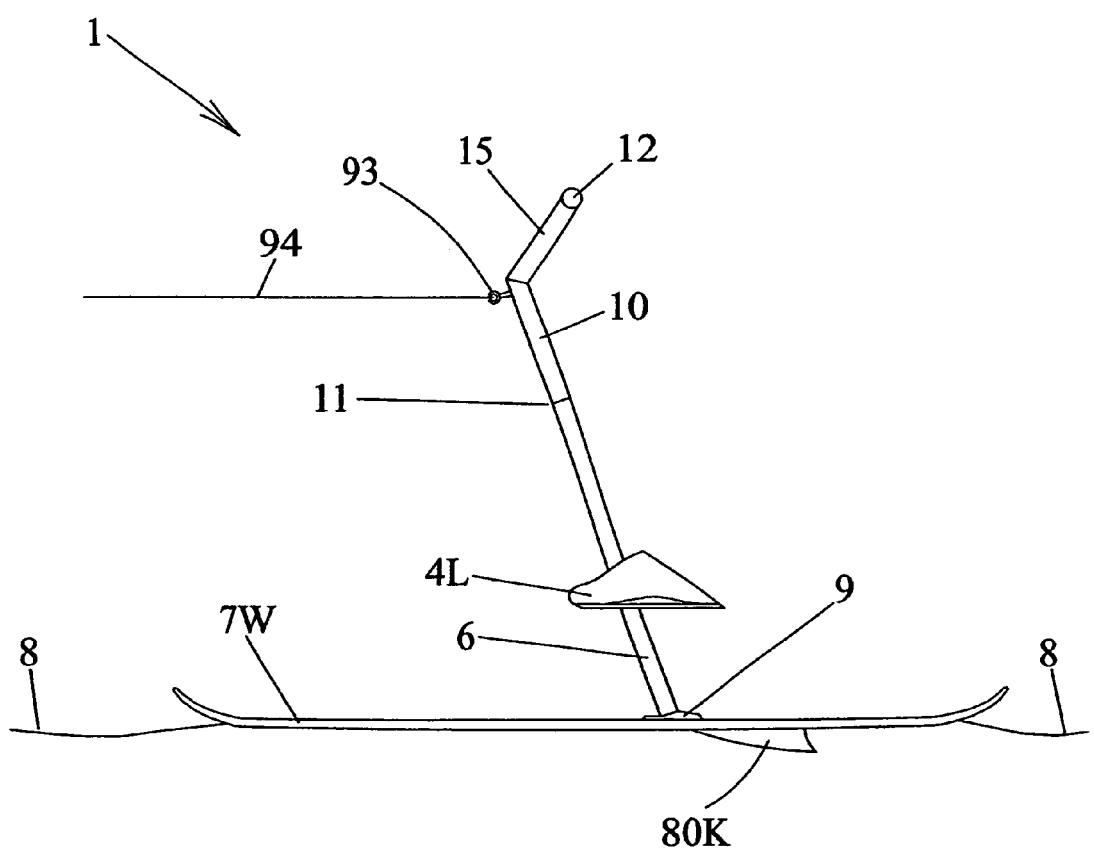

FIGS. 24A and 24B show side views of snow and water pogo-ski embodiments respectively, fitted with an optional tow cable fitting. FIG. 24A shows a pogo-ski 1 with a snow ski 7S, and FIG. 24B shows a pogo-ski with a water-ski 7W.

FIG. 24A shows a pogo-ski 1, wherein a snow ski 7S supports a lower post 6 to which foot supports are attached (left foot support 4L is visible in this view, and here comprises a plate-like foot support with a pitch-axis rotational degree-of-freedom). The lower post is fitted with an optional tow fitting 93, to which a tow cable 94 can be detachably connected (tow cable shown in connected configuration). The upper end of the lower post 6 supports an upper post 10 through upper post connecting means 11, and the upper post 10 in turn supports a handhold 12 through handhold connecting means 15. As illustrated, the upper post connecting mean 11 includes means for setting the height of the handhold means 12 at different levels and comprises a telescopic sidable connection between the upper post 10 and lower post 6 and includes a quick-release mechanism 41.

FIG. 24B shows a pogo-ski 1, wherein the ski is a water-ski 7W with an optional water keel 80K. The water-ski 7W supports a lower post 6 to which foot supports are attached (left foot support 4L is visible in this view, and here comprises a water-ski type foot support suitable for engagement by a bare foot of the user). The upper end of the lower post 6 supports an upper post 10 through upper post connecting means 11. The upper post is here fitted with an optional tow fitting 93, to which a tow cable 94 can be detachably connected (tow cable shown in connected configuration). The upper post 10 also supports a handhold 12 through handhold connection mean 15. In the illustrated embodiment note that the post (including lower post 6, upper post connecting means 15) is nonlinear such that relative to a line connecting (i) an upper end of said post adjacent to said handhold means 12 and (ii) a lower end of said post adjacent to said snowboard 7, a middle portion of said post between said upper end and said lower end is located such that said middle portion lies forward of said line. Thus by visual inspection FIG. 24B shows an embodiment wherein said pogo-ski 1 is configured such that said pogo-ski 1 does not contact or engage with the buttocks of a user during normal use of said pogo-ski by said user. This illustrated nonlinear post configuration will also facilitate a reduced likelihood of a user hitting said post with his or her knees as they bend and yaw. Note that in variant embodiments of either snow or water-ski versions of pogo-skis, optional tow fittings could be located attached to either or both of the lower and upper posts.

The embodiments of both FIG. 24A and FIG. 24B provide a pogo-ski 1, further comprising tow cable engagement means (here the tow cable fitting 93) for engaging a tow cable 94 intended for towing said pogo-ski along with said user riding thereon. The towing entity may be motorized or biologic, and may for instance be a snowmobile or motorboat or water-scooter, or a horse or dog or dolphin. Appropriate safety precautions and design features should be incorporated for both the tow entity and the user of the pogo-ski, as applicable.

More generally, appropriate safety features and placards should be engineered into any pogo-ski, based on state-of-the-art operational and user knowledge combined with sound safety engineering principles.

Note that many embodiments of pogo-skis can be used "as-is" or with minor adaptations in certain attachments and fittings, for use both on solid surfaces (e.g., snow in winter) and liquid surfaces (e.g., water in summer).

While several preferred embodiments have been illustrated and described in detail above, it should be understood that many further variations and modifications can be made within the spirit and scope of the invention as inclusively defined in the attached claims.

What is claimed is:

1. A pogo-ski, comprising in combination:
   means for sliding on a sliding surface comprising a single ski and absent any other member for sliding on said sliding surface, wherein said single ski comprises a single contiguous running surface bounded by a ski shovel in front, a left edge, a right edge and rear extremity; and
   user interface means (i) providing a left foot support and a right foot support for supporting the feet of a user and (ii) providing handhold means for being holdable by at least one hand of said user;
   wherein said user interface means comprises in combination:
   (i) said left foot support located above said single ski and connected to said single ski by left connecting means including means for permitting said left foot support some measure of spring force affected vertical movement relative to said single ski;
   (ii) said right foot support located above said single ski and connected to said single ski by right connecting means including means for permitting said right foot support some measure of spring force affected vertical movement relative to said single ski; and
   (iii) said handhold means located above said single ski and connected to said single ski by handhold connecting means comprising post means including an upper post and a lower post for connecting said handhold means with said single ski, wherein said upper post is connected by upper post connecting means to said lower post and wherein said upper post is located substantially above said lower post, and wherein said lower post is connected by lower post connecting means to said single ski.

2. A pogo-ski, comprising in combination:
   a ski providing a laterally substantially contiguously located sliding means below a user for said user to slide down a sliding surface;
   said ski comprising a single ski and absent any other member for sliding on said sliding surface, wherein said said single ski comprises a single contiguous running surface bounded by a ski shovel in front, a left edge, a right edge and rear extremity;
   a left foot support located above and connected to said ski by left coupling means for permitting variable left spacing between said left foot support and said ski;
   a right foot support located above and connected to said ski by right coupling means for permitting variable right spacing between said right foot support and said ski;

and handhold means for being holdable by at least one hand of said user, which handhold means are located above and connected to said ski.

3. A pogo-ski, comprising in combination:
a single snowboard;
wherein said single snowboard comprises a single contiguous running surface bounded by a shovel in front, a left edge, a right edge and rear extremity;
handhold means for being holdable by at least one hand of said user, which handhold means are connected to said snowboard by a post;
a left foot support connected to said post by left post coupling means for permitting said left foot support to move to varying left height locations along said post;
and a right foot support connected to said post by right post coupling means for permitting said right foot support to move to varying right height locations along said post.

4. The pogo-ski of claim 1, wherein said sliding surface is a snow surface.

5. The pogo-ski of claim 1, wherein said sliding surface is a frozen surface.

6. The pogo-ski of claim 1, wherein said sliding surface is a water surface.

7. The pogo-ski of claim 1, wherein said sliding surface is a low-friction solid sliding surface.

8. The pogo-ski of claim 1, wherein the majority of said user's weight is supported by said left foot support and said right foot support and the balance of said user's weight is supported by said handhold means, when said user is riding on said pogo-ski in a non-accelerating condition.

9. The pogo-ski of claim 1, wherein said lower post connecting means includes a spring acting between said lower post and said single ski.

10. The pogo-ski of claim 1, wherein said lower post connecting means includes a damper acting between said lower post and said single ski.

11. The pogo-ski of claim 1, wherein said left foot support is located on the left side of said lower post and wherein said right foot support is located on the right side of said lower post.

12. The pogo-ski of claim 1, wherein said left connecting means and said right connecting means together provide at least one spring in the connection between said left foot support and said right foot support on the one hand, and said lower post on the other hand.

13. The pogo-ski of claim 1, wherein said left connecting means and said right connecting means together provide at least one damper in the connection between said left foot support and said right foot support on the one hand, and said lower post on the other hand.

14. The pogo-ski of claim 1, wherein said left connecting means includes left translational motion permitting means for permitting said left foot support to move in a direction including a vertical component, and wherein said right connecting means includes right translational motion permitting means for permitting said right foot support to move in a direction including a vertical component.

15. The pogo-ski of claim 1, wherein said left connecting means provides spring means in the connection between said left foot support and said lower post, for providing a spring force with a vertical component between said single ski and said left foot support.

16. The pogo-ski of claim 1, wherein said right connecting means provides spring means in the connection between said right foot support and said lower post, for providing a spring force with a vertical component between said single ski and said right foot support.

17. The pogo-ski of claim 1, wherein said left foot support and said right foot support each include a foot plate on which the left foot and right foot of the user, respectively, can be supported.

18. The pogo-ski of claim 17, wherein said left foot support and said right foot support each include foot enclosing surfaces connected to said foot plates, which foot enclosing surfaces enclose the sides and top of said left foot and right foot of the user, respectively.

19. The pogo-ski of claim 17, wherein said left foot support and said right foot support each include strap means connected to said foot plate, which strap means restrain lateral and upward movement of said left foot and right foot of the user, respectively.

20. The pogo-ski of claim 17, wherein said left foot support and said right foot support each include a toe clip connected to said foot plate.

21. The pogo-ski of claim 17, wherein said left foot support and said right foot support each include binding means for permitting left and right boots of said user to be securely attached to said left foot support and said right foot support, respectively.

22. The pogo-ski of claim 1, wherein said upper post connecting means includes means for setting the height of said handhold means at different levels.

23. The pogo-ski of claim 22, wherein said upper post connecting means comprises a telescopic slidable connection between said upper post and said lower post.

24. The pogo-ski of claim 22, wherein said means for setting the height include a quick-release mechanism.

25. The pogo-ski of claim 1, wherein said handhold means comprises left and right handlebars suitable for holding by the left and right hands of said user, respectively, and wherein said handhold connection means comprises means for connecting said left and right handlebars to the top of said upper post.

26. The pogo-ski of claim 25, wherein said left and right handlebars include contoured surfaces which can be gripped by the fingers of the left and right hands of said user.

27. The pogo-ski of claim 25, further comprising telescoping means for varying the spacing between the left end of the left handlebar and the right end of the right handlebar.

28. The pogo-ski of claim 25, further comprising folding means for stowing said handlebars in a configuration with reduced spacing between the left end of the left handlebar and the right end of the right handlebar.

29. The pogo-ski of claim 1, wherein said lower post connecting means provides a detachable connection between said single ski and said lower post.

30. The pogo-ski of claim 1, wherein said lower post connecting means provides a connection with variable angle between said single ski and said lower post.

31. The pogo-ski of claim 1, wherein said single ski has a single ski shovel at its forward extremity.

32. The pogo-ski of claim 1, wherein said single ski has a ski shovel at its forward extremity and has a second ski shovel at its aft extremity.

33. The pogo-ski of claim 1, wherein said single ski has camber to distribute load along its running surface when said user is on said pogo-ski with said user's feet supported by said left foot support and said right foot support.

34. The pogo-ski of claim 1, further comprising a low-friction lower running surface.

35. The pogo-ski of claim 1, wherein said single ski has outwardly concave curved edges when viewed in plan view.

36. The pogo-ski of claim 1, further comprising sharp cornered edges along the lower left and right corners of said single ski when viewed in transverse cross-section.

37. The pogo-ski of claim 1, wherein said single ski is thicker near the location of said lower post connecting means than at locations near the forward and aft ends of said single ski.

38. The pogo-ski of claim 1, wherein said single ski is a downhill ski or a ski-jumping ski.

39. The pogo-ski of claim 1, wherein said single ski is a short single ski.

40. The pogo-ski of claim 1, wherein said single ski is a snowboard.

41. The pogo-ski of claim 1, wherein said single ski is a water-ski.

42. The pogo-ski of claim 1, wherein said user can impart a rolling moment on said single ski by at least one of (i) shifting his or her weight laterally or (ii) shifting the amount of his or her weight acting on said left foot support as compared with the amount of his or her weight acting on said right foot support or (iii) applying a rolling moment to said handhold means.

43. The pogo-ski of claim 1, wherein said user can impart a yawing moment on said single ski by at least one of (i) pushing forward with a foot on either the left foot support or the right foot support or (ii) applying a yawing moment to said handhold means.

44. The pogo-ski of claim 1, wherein said left connecting means including means for permitting said left foot support some measure of spring force affected vertical movement relative to said single ski, and said right connecting means including means for permitting said right foot support some measure of spring force affected vertical movement relative to said single ski, together contribute to bouncing means for enabling said user to deliberately and repeatedly bounce while skiing on said pogo-ski.

45. The pogo-ski of claim 1, wherein said handhold connecting means includes a spring element, which contributes to bouncing means for enabling said user to deliberately and repeatedly bounce while skiing on said pogo-ski.

46. The pogo-ski of claim 1, further comprising control means comprising at least one of (i) hand control means integrated with said handhold means or (ii) foot control means connected to at least one of said left foot support or said right foot support, for said user to make a control input to said pogo-ski.

47. The pogo-ski of claim 46, wherein said control means includes at least one of (i) braking control means for increasing friction or drag acting on said pogo-ski as it moves over said sliding surface, or (ii) steering means for controllably engaging said sliding surface so as to generate a desired yawing moment acting on said single ski.

48. The pogo-ski of claim 1, further comprising a safety strap suitable for connecting said pogo-ski to said user and suitable for preventing said pogo-ski from sliding away from said user in the event that said user falls from said pogo-ski.

49. The pogo-ski of claim 1, further comprising tow cable engagement means for engaging a tow cable intended for towing said pogo-ski along with said user riding thereon.

50. The pogo-ski of claim 1, further comprising chairlift engagement means for enabling said pogo-ski to hang from said chairlift while said user is riding on said chairlift in a seated posture.

51. The pogo-ski of claim 2, wherein said left coupling means comprises left spring coupling means and wherein said right coupling means comprises right spring coupling means.

52. The pogo-ski of claim 51, wherein said left spring coupling means and said right spring coupling means are mutually independent and together enable said variable left spacing and said variable right spacing to vary independently of each other.

53. The pogo-ski of claim 2, wherein said left coupling means and said right coupling means are connected to each other.

54. The pogo-ski of claim 2, wherein the weight of said user is transferred to said ski solely through a combination of said left foot support, said right foot support and said handhold means while said user is sliding down said sliding surface.

55. The pogo-ski of claim 2, wherein the longitudinal locations of said left foot support and said right foot support are at least approximately equal.

56. The pogo-ski of claim 55, wherein the longitudinal locations of said left foot support and said right foot support have some longitudinal overlap.

57. The pogo-ski of claim 3, wherein said left post coupling means comprises left sprung coupling means and wherein said right post coupling means comprises right sprung coupling means.

58. The pogo-ski of claim 57, wherein said left sprung coupling means and said right sprung coupling means together facilitate unweighting of said snowboard by said user for at least one of turn initiation or bouncing or other purposes.

59. The pogo-ski of claim 3, wherein said post provides a connection between said snowboard and said handhold means which is substantially rigid in yaw.

60. The pogo-ski of claim 3, wherein said post provides a connection between said snowboard and said handhold means which is substantially rigid in pitch.

61. The pogo-ski of claim 3, wherein said post is nonlinear such that relative to a line connecting (i) an upper end of said post adjacent to said handhold means and (ii) a lower end of said post adjacent to said snowboard, a middle portion of said post between said upper end and said lower end is located such that said middle portion lies forward of said line.

62. The pogo-ski of claim 3, wherein said pogo-ski can be mounted and used by said user in a substantially standing posture, with said user's left foot supported by said left foot support and said right foot supported by said right foot support.

63. The pogo-ski of claim 3, wherein said pogo-ski can be mounted and used by said user in a substantially standing posture, with said user's left foot supported by said left foot support and said right foot supported by said right foot support and at least one of said user's hands holding said handhold means.

64. The pogo-ski of claim 3, wherein said pogo-ski is configured such that said pogo-ski does not contact or engage with the buttocks of said user during normal use of said pogo-ski by said user.

65. The pogo-ski of claim 14, further comprising translational motion linking means for requiring an upward translational motion of said left foot support whenever said right foot support executes a downward translational motion and for requiring a downward translational motion of said left foot support whenever said right foot support executes an upward translational motion.

66. The pogo-ski of claim 65, wherein said translational motion linking means comprises rack and pinion means including a left rack connected to at least one of said left foot support and said left foot support connecting means, and a right rack connected to at least one of said right foot support and said right foot support connecting means, and a common pinion which mates with both said left rack and said right rack.

67. The pogo-ski of claim 14, further comprising a linking cable which runs around pulley means attached to said lower post and which linking cable is connected on one side of said pulley means to at least one of said left foot support and said left foot support connecting means, and is connected on the other side of said pulley to at least one of said right foot support and said right foot support connecting means.

68. The pogo-ski of claim 67, wherein said linking cable includes an elastic element permitting it to effectively stretch.

69. The pogo-ski of claim 67, wherein said linking cable includes a viscoelastic element.

70. The pogo-ski of claim 65, wherein said translational motion linking means includes a hydraulic linking tube with left and right connections to the left foot support and right foot support respectively.

71. The pogo-ski of claim 65, wherein said translational motion linking means includes a pneumatic linking tube with left and right connections to the left foot support and right foot support respectively.

* * * * *